(12) United States Patent
Ide et al.

(10) Patent No.: US 8,385,365 B2
(45) Date of Patent: Feb. 26, 2013

(54) COMMUNICATION SYSTEM, COMMUNICATION APPARATUS, AND PACKET LENGTH CONTROL METHOD

(75) Inventors: Naoki Ide, Tokyo (JP); Fumio Kubono, Tokyo (JP); Yoshihito Ishibashi, Tokyo (JP); Shoji Nagai, Tokyo (JP); Yuko Yoshida, Tokyo (JP)

(73) Assignee: Sony Corporation, Tokyo (JP)

( * ) Notice: Subject to any disclaimer, the term of this patent is extended or adjusted under 35 U.S.C. 154(b) by 412 days.

(21) Appl. No.: 12/706,595

(22) Filed: Feb. 16, 2010

(65) Prior Publication Data

US 2010/0215056 A1    Aug. 26, 2010

(30) Foreign Application Priority Data

Feb. 23, 2009    (JP) ................ P2009-039939

(51) Int. Cl.
*H04J 3/16*    (2006.01)
(52) U.S. Cl. ...................... 370/470; 370/252
(58) Field of Classification Search ............. 370/252, 370/470, 471, 472, 473, 474, 476
See application file for complete search history.

(56) References Cited

U.S. PATENT DOCUMENTS

| | | | |
|---|---|---|---|
| 6,791,995 B1 * | 9/2004 | Azenkot et al. ............. 370/436 |
| 6,856,657 B1 * | 2/2005 | Classon et al. ............. 375/341 |
| 7,535,980 B2 * | 5/2009 | Yang et al. ............. 375/350 |
| 8,074,147 B2 * | 12/2011 | Lee et al. ............. 714/758 |
| 2002/0186765 A1 * | 12/2002 | Morley et al. ............. 375/240.2 |
| 2004/0081247 A1 * | 4/2004 | Chang et al. ............. 375/259 |
| 2006/0291591 A1 | 12/2006 | Ghosh |
| 2008/0292038 A1 | 11/2008 | Ide |

FOREIGN PATENT DOCUMENTS

| | | |
|---|---|---|
| JP | 6-29959 | 2/1994 |
| JP | 2005-236416 | 9/2005 |
| JP | 2008-294730 | 12/2008 |
| JP | 2008-547327 | 12/2008 |

* cited by examiner

*Primary Examiner* — Ricky Ngo
*Assistant Examiner* — Christine Ng
(74) *Attorney, Agent, or Firm* — Finnegan Henderson Farabow Garrett & Dunner LLP

(57) ABSTRACT

There is provided a communication apparatus includes a soft decision data detection section which detects soft decision data from a received digitally modulated signal; an indicator calculation section which calculates an indicator indicating a degree of variation in the soft decision data detected by the soft decision data detection section; and a packet length control section which controls a packet length in accordance with the indicator calculated by the indicator calculation section.

15 Claims, 29 Drawing Sheets

(A) INDEX INDICATOR VS. ERROR OCCURRENCE RATE

| INDEX INDICATOR SDI [%] | bER | 1024 [Byte] | 512 [Byte] | 256 [Byte] | 128 [Byte] | 64 [Byte] |
|---|---|---|---|---|---|---|
| 6.0 | 0.00000 | 0.0 | 0.0 | 0.0 | 0.0 | 0.0 |
| 7.0 | 0.00000 | 0.0 | 0.0 | 0.0 | 0.0 | 0.0 |
| 8.0 | 0.00000 | 0.0 | 0.0 | 0.0 | 0.0 | 0.0 |
| 9.0 | 0.00000 | 0.0 | 0.1 | 0.1 | 0.0 | 0.0 |
| 10.0 | 0.00000 | 0.2 | 1.1 | 0.6 | 0.3 | 0.1 |
| 11.0 | 0.00000 | 2.2 | 6.1 | 3.1 | 1.6 | 0.8 |
| 12.0 | 0.00002 | 11.9 | 21.8 | 11.6 | 6.0 | 3.0 |
| 13.0 | 0.00006 | 38.8 | 51.7 | 30.5 | 16.6 | 8.7 |
| 14.0 | 0.00018 | 76.6 | 82.8 | 58.5 | 35.6 | 19.7 |
| 15.0 | 0.00043 | 97.0 | | | | |

(B) INDEX INDICATOR TABLE

| INDEX INDICATOR SDI [%] | PACKET LENGTH [Byte] |
|---|---|
| 10.0 | 1024 |
| 10.5 | 1024 |
| 11.0 | 1024 |
| 11.5 | 512 |
| 12.0 | 256 |
| 12.5 | 128 |
| 13.0 | 64 |
| 13.5 | - |
| 14.0 | - |
| 14.5 | - |

(MODIFIED EXAMPLE) CONFIGURATION FOR CALCULATING PACKET LENGTH

FIG.13

AN EXAMPLE OF INDEX INDICATOR TABLE OBTAINED BY CALCULATION

| INDEX INDICATOR SDI [%] | bER | PACKET LENGTH [Byte] |
|---|---|---|
| 11.0 | 0.00000 | 18608 |
| 11.5 | 0.00001 | 11571 |
| 12.0 | 0.00002 | 7560 |
| 12.5 | 0.00003 | 5141 |
| 13.0 | 0.00006 | 3613 |
| 13.5 | 0.00011 | 2608 |
| 14.0 | 0.00018 | 1925 |
| 14.5 | 0.00028 | 1448 |
| 15.0 | 0.00043 | 1106 |
| 15.5 | 0.00063 | 857 |
| 16.0 | 0.00089 | 672 |

RELATIONSHIP BETWEEN PACKET LENGTH AND INDEX INDICATOR OBTAINED BY CALCULATION

FIG.17
(A) CONFIGURATION FOR SELECTING PACKET LENGTH FROM INDEX INDICATOR TABLE
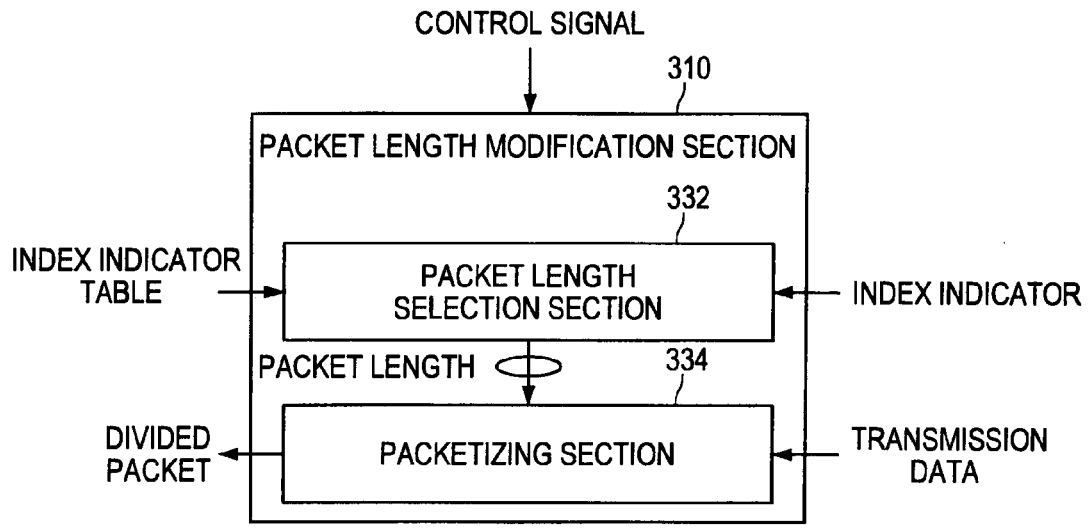
(B) CONFIGURATION FOR CALCULATING PACKET LENGTH
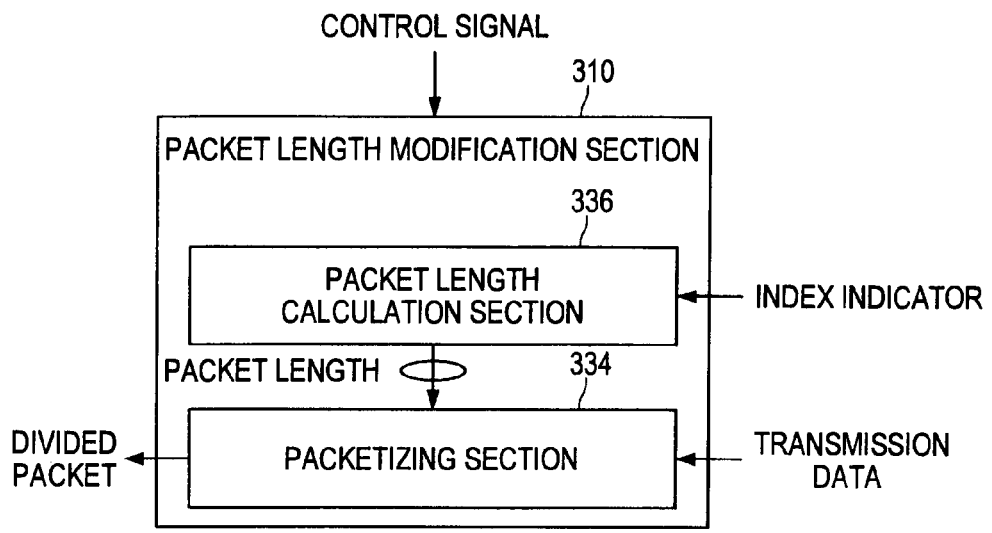

METHOD FOR TRANSMITTING WHILE DYNAMICALLY MODIFYING PACKET LENGTH

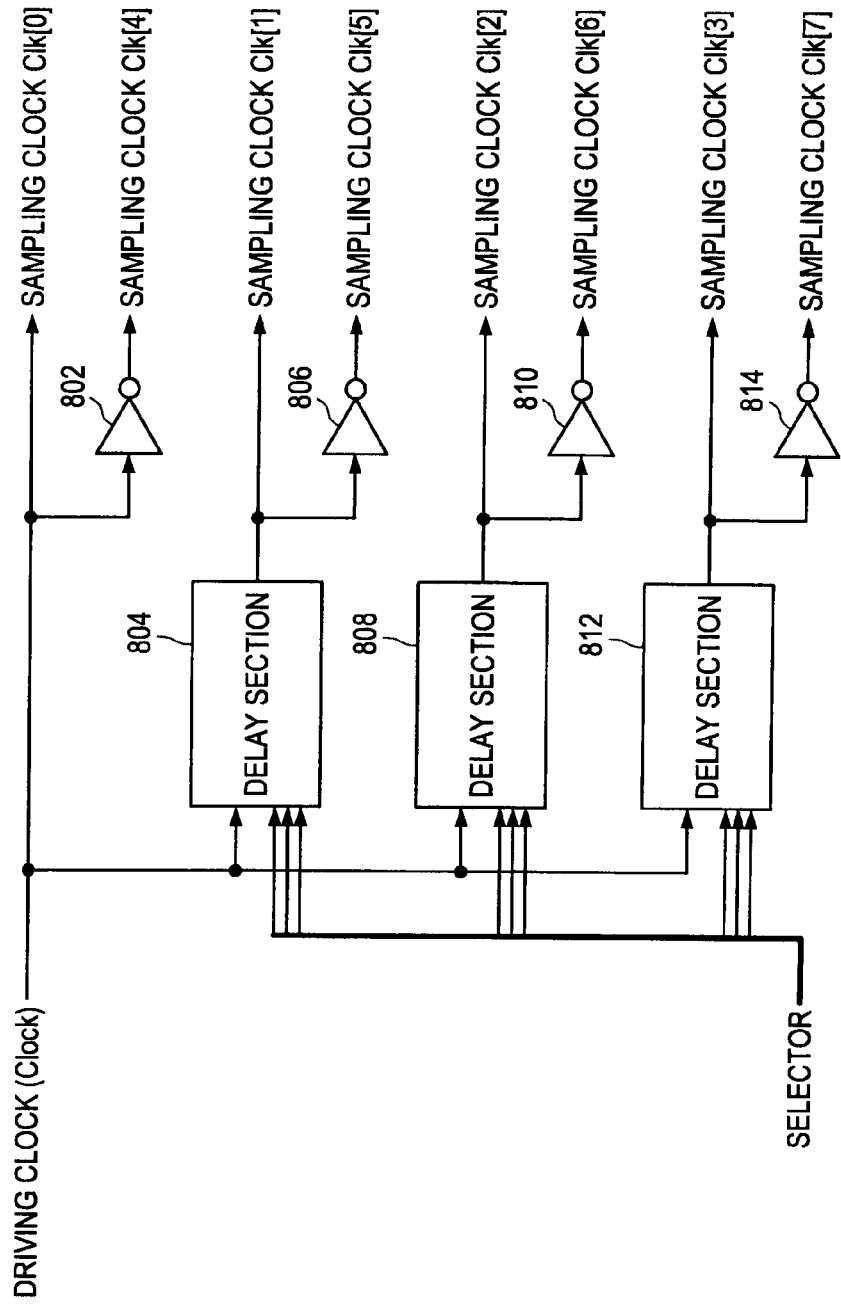

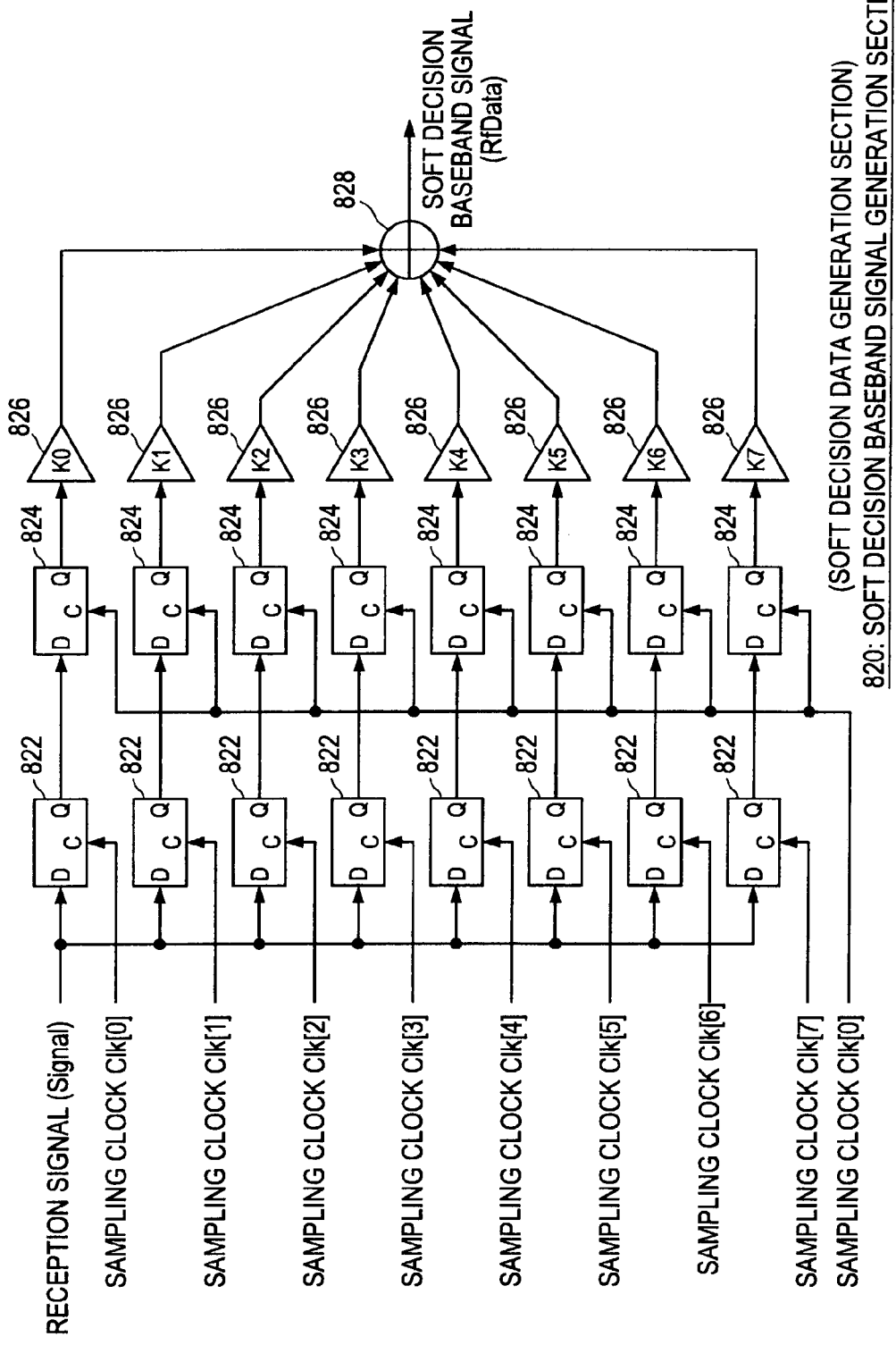

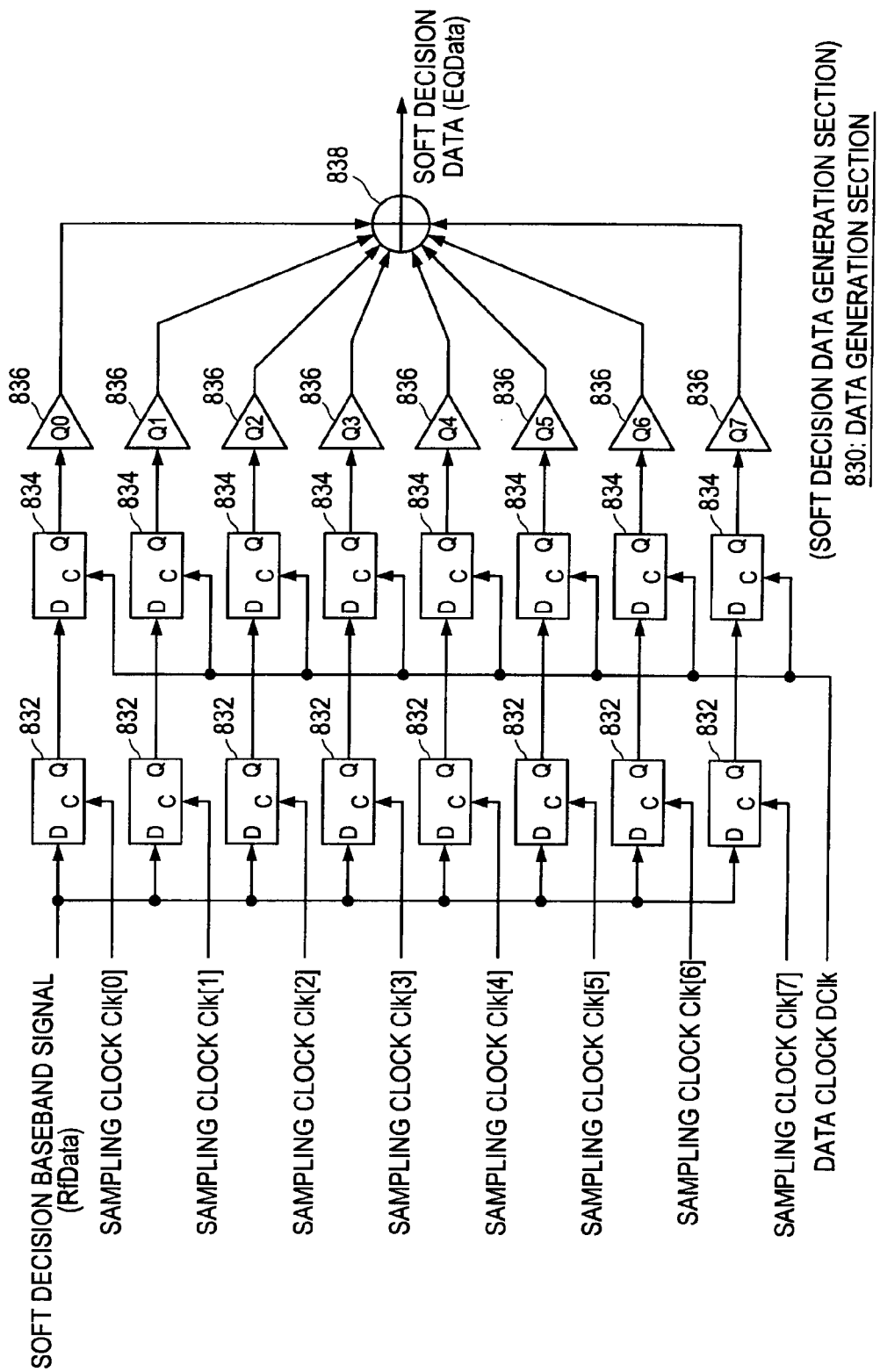

COMMUNICATION SYSTEM, COMMUNICATION APPARATUS, AND PACKET LENGTH CONTROL METHOD

BACKGROUND OF THE INVENTION

1. Field of the Invention

The present invention relates to a communication system, a communication apparatus, and a packet length control method.

2. Description of the Related Art

When data is transmitted/received between a transmitter and a receiver, the data may not be transmitted/received correctly due to communication channel characteristics, communication path congestion, and the like. In such a case, the transmitter may repeatedly perform retransmission processing of the data until the data is correctly transmitted to the receiver. However, if the size of the data is large, it is often difficult to transmit the data correctly even though the retransmission processing is repeated many times. In such a case, the transmitter divides the large size data into small size data, and then transmits the data. The small size data is more likely to be transmitted correctly than the large size data. Therefore, by dividing the data into small data and transmitting the small data, the data can be transmitted correctly.

When transmitting a plurality of divided data, the transmitter generates a packet individually for each divided data. The transmitter performs modulation on each packet by using a predetermined modulation method, and transmits the packets to the receiver. As the predetermined modulation method, for example, a phase shift keying method, an amplitude modulation method, and the like are used. The receiver receives a modulated signal transmitted from the transmitter, demodulates the modulated signal by using a predetermined method (for example, refer to Japanese Patent Application Laid-Open No. 2008-294730), and extracts the divided data included in each packet. When having received all the divided data, the receiver combines the divided data to restore the original data. By using a method as described above, data can be transmitted from the transmitter to the receiver with a relatively high possibility even if the communication environment is bad or the like.

SUMMARY OF THE INVENTION

However, information necessary for communication, such as a header is added to each packet. In addition, a predetermined processing time is generated before and after transmission of each packet. Therefore, transmitting a plurality of small size data by using a plurality of packets may require longer time to transmit data than transmitting large size data by using one packet. However, considering that the large size data is retransmitted many times, in many cases, data can be transmitted in a shorter time by dividing data and transmitting the divided data. Of course, if the size of the divided data is large, data may not be transmitted in a short time even when the data is divided. Therefore, a method for dividing data into an appropriate size while considering the time used to transmit one packet, dependency of transmission error rate on data size, and the like is desired.

In light of the foregoing, it is desirable to provide a novel and improved communication system, communication apparatus, and packet length control method which can determine appropriate divided data size considering transmission error rate with a relatively small processing load.

According to an embodiment of the present invention, there is provided a communication apparatus which includes a soft decision data detection section which detects soft decision data from a received digitally modulated signal; an indicator calculation section which calculates an indicator indicating a degree of variation in the soft decision data detected by the soft decision data detection section; and a packet length control section which controls a packet length in accordance with the indicator calculated by the indicator calculation section.

Furthermore, the indicator calculation section may include a standard deviation calculation section which calculates a standard deviation of the soft decision data of some or all of packets included in the digitally modulated signal; and an absolute value average calculation section which calculates an average value of absolute values of the soft decision data of some or all of the packets, and the indicator calculation section calculates the indicator based on the standard deviation calculated by the standard deviation calculation section and the average value calculated by the absolute value average calculation section.

Furthermore, the indicator calculation section may calculate the indicator $S=\sigma/(2*E)$ based on the standard deviation $\sigma$ and the average value E.

Furthermore, the packet length control section may shorten the packet length when the indicator S is large, and lengthens the packet length when the indicator S is small.

Furthermore, the packet length control section may refer to a predetermined table configured to associate predetermined packet lengths with the indicators S, select a predetermined packet length in accordance with the indicator S calculated by the indicator calculation section, and packetize data so that the data has the predetermined packet length.

Furthermore, the packet length control section may include a packet length calculation section which uses a predetermined calculation formula for calculating an expected value of a time used to transmit all data of n bits which is transmitted by dividing the data into packets of k bits (n>k) when a communication condition corresponds to the indicator S, and calculates a packet length k which makes the expected value minimum; and a packetizing section which divides transmission data based on the packet length k calculated by the packet length calculation section in accordance with the indicator S calculated by the indicator calculation section and the number of bits n of the transmission data, and packetizes the divided transmission data.

Furthermore, the communication apparatus may further include an indicator transmission section which transmits information of the indicator calculated by the indicator calculation section to a transmission source of the digitally modulated signal.

Furthermore, the communication apparatus may further include a communication control section which stops data transmission processing when the indicator calculated by the indicator calculation section is greater than a predetermined threshold value, and re-starts the data transmission processing when the indicator is smaller than a predetermined threshold value.

According to an embodiment of the present invention, there is provided a communication apparatus which includes an indicator reception section which receives an indicator when soft decision data of a digitally modulated signal is detected in a transmission destination of the digitally modulated signal transmitted by the communication apparatus, and the indicator representing a degree of variation in the soft decision data is calculated and transmitted to the communication apparatus; and a packet length control section which controls a packet length in accordance with the indicator received by the indicator reception section.

Furthermore, the packet length control section may shorten the packet length when the indicator S is large, and lengthens the packet length when the indicator S is small.

Furthermore, the packet length control section may refer to a predetermined table configured to associate predetermined packet lengths with the indicators, select a predetermined packet length in accordance with the indicator calculated by the indicator calculation section, and packetize data by the predetermined packet length.

Furthermore, the packet length control section may include a packet length calculation section which uses a predetermined calculation formula for estimating an expected value of a time used to transmit all data of n bits which is transmitted by dividing the data into packets of k bits (n>k) when a communication condition corresponds to the indicator S, and calculates a packet length k which makes the expected value minimum; and a packetizing section which divides transmission data based on the packet length k calculated by the packet length calculation section in accordance with the indicator S calculated by the indicator calculation section and the number of bits n of the transmission data, and packetizes the divided transmission data.

Furthermore, the communication apparatus may further include a communication control section which transmits a digitally modulated signal including a predetermined packet when the indicator received by the indicator reception section is greater than a predetermined threshold value.

According to an embodiment of the present invention, there is provided a communication system which includes a first communication device including a signal transmission section which transmits a digitally modulated signal to a second communication device, an indicator reception section which receives an indicator transmitted from the second communication device, and a packet length control section which controls a packet length of a packet to be transmitted to the second communication device in accordance with the indicator received by the indicator reception section; and the second communication device including a signal reception section which receives the digitally modulated signal transmitted from the first communication device, a soft decision data detection section which detects soft decision data from the digitally modulated signal received by the signal reception section, an indicator calculation section which calculates an indicator indicating a degree of variation in the soft decision data detected by the soft decision data detection section, and an indicator transmission section which transmits the indicator calculated by the indicator calculation section to the first communication device.

According to another embodiment of the present invention, there is provided a packet length control method, including the steps of detecting soft decision data from a received digitally modulated signal; calculating an indicator indicating a degree of variation in the soft decision data detected in the step of detecting soft decision data; and controlling a packet length in accordance with the indicator calculated in the step of calculating an indicator.

According to another embodiment of the present invention, there is provided a packet length control method, including the steps of receiving an indicator when soft decision data of a transmitted digitally modulated signal is detected in a transmission destination of the digitally modulated signal, and the indicator representing a degree of variation in the soft decision data is calculated and transmitted to a transmission source of the digitally modulated signal; and controlling a packet length in accordance with the indicator received in the step of receiving an indicator.

According to another embodiment of the present invention, there is provided a packet length control method, including the steps of by a first communication device, transmitting a digitally modulated signal to a second communication device; by the second communication device, receiving the digitally modulated signal transmitted from the first communication device; detecting soft decision data from the digitally modulated signal received in the step of receiving the digitally modulated signal; calculating an indicator indicating a degree of variation in the soft decision data detected in the step of detecting soft decision data; transmitting the indicator calculated in the step of calculating an indicator to the first communication device; by the first communication device, receiving the indicator transmitted from the second communication device; and controlling a packet length of a packet to be transmitted to the second communication device in accordance with the indicator received in the step of receiving the indicator.

According to the embodiments of the present invention described above, it is possible to determine appropriate divided data size considering transmission error rate with a relatively small processing load.

BRIEF DESCRIPTION OF THE DRAWINGS

FIG. 13 shows an example of an indicator table determined based on the packet length determination method according to the modified example of the first embodiment;

FIG. 17 shows a functional configuration example of a packet length modification section according to the second embodiment;

FIG. 27 shows a circuit configuration example of a soft decision data generation section included in the communication apparatuses according to each embodiment of the present invention;

FIG. 28 shows a circuit configuration example of a soft decision data generation section included in the communication apparatuses according to each embodiment of the present invention; and FIG. 29 shows a circuit configuration example of a soft decision data generation section included in the communication apparatuses according to each embodiment of the present invention.

DETAILED DESCRIPTION OF THE EMBODIMENTS

Figure 1:
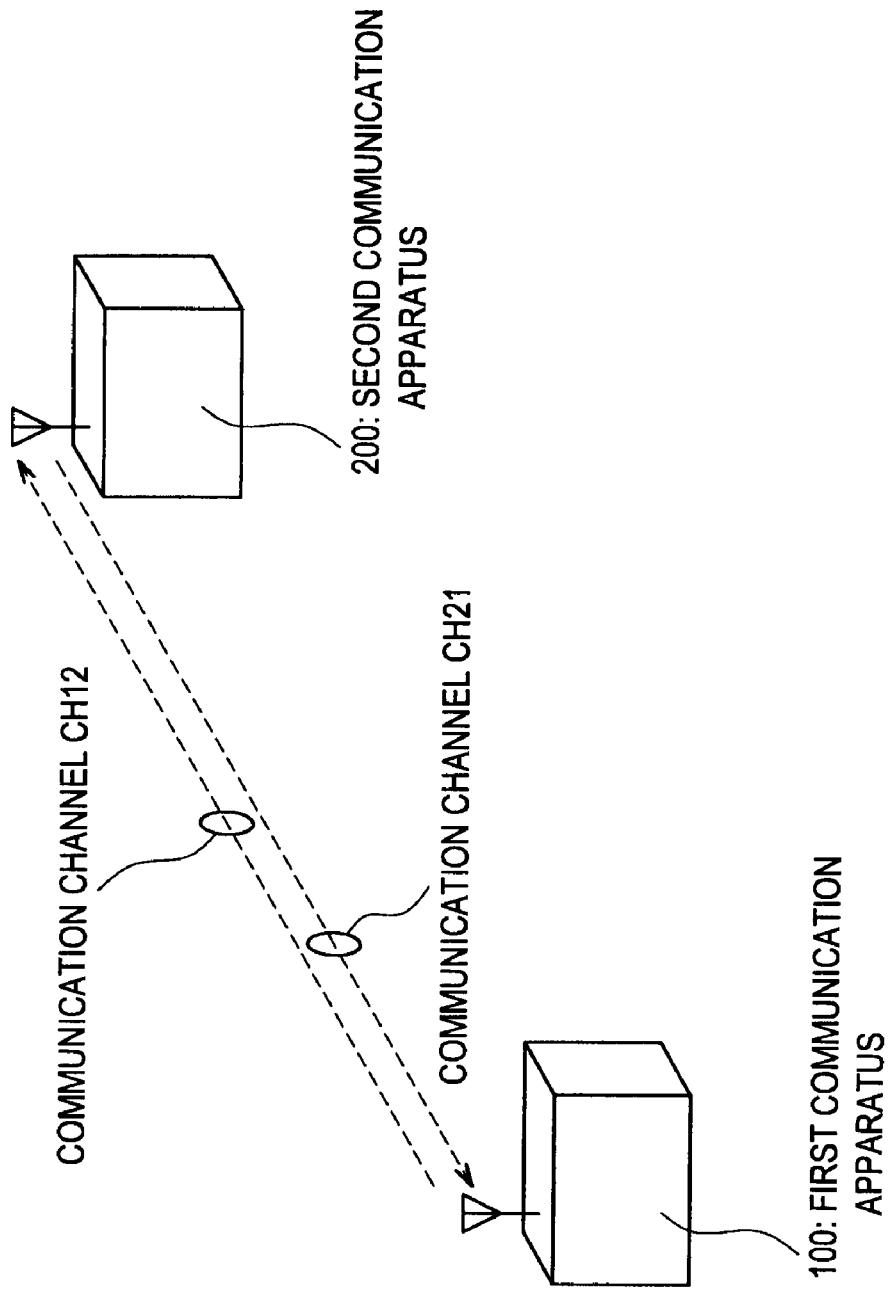
FIG. 1 shows a configuration example of a communication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Here, a flow of the description below related to embodiments of the present invention will be briefly described.

First, a configuration of a communication system 10 according to a first embodiment of the present invention will be briefly described with reference to FIG. 1. Next, a retransmission control method and a data-divided transmission method will be described with reference to FIG. 2. Next, an estimation method of transmission error rate according to the first embodiment will be described with reference to FIGS. 3 to 6. Next, a packet length modification method according to the first embodiment will be described with reference to FIG. 7.

Next, a functional configuration of each communication apparatus according to the first embodiment will be described with reference to FIG. 8. In the above description, a determination method of an indicator corresponding to the transmission error rate will be described with reference to FIGS. 9 and 10. Next, with reference to FIGS. 11 to 14, a calculation method of the indicator corresponding to the transmission error rate will be described, and a method for appropriately modifying a packet length based on the indicator calculated by using the calculation method.

Next, a packet length modification method according to a second embodiment of the present invention will be described with reference to FIG. 15. Next, a functional configuration of each communication apparatus according to the second embodiment will be described with reference to FIGS. 16 and 17. Next, a configuration of a transmission packet and an indicator transmission method according to the second embodiment will be described with reference to FIG. 18.

Next, a functional configuration of each communication apparatus according to a third embodiment of the present invention will be described with reference to FIG. 19. Next, a hardware configuration of each communication apparatus according to the third embodiment will be described with reference to FIGS. 20 to 23. Next, a functional configuration of each communication apparatus according to a modified example of the third embodiment will be described with reference to FIG. 24. Next, a flow of data read/write processing according to the third embodiment will be described with reference to FIG. 25. Next, a packet transmission method according to the third embodiment will be described with reference to FIG. 26. And then, a detection method of soft decision data will be described with reference to FIGS. 27 to 29.

(Description Items)
1: First Embodiment
 1-1: System configuration
 1-2: Retransmission control method and data-divided transmission method
 1-3: Estimation method of transmission error rate
 1-4: Packet length modification method
 1-5: Functional configuration of communication apparatus
  1-5-1: Functional configuration of first communication apparatus 100
  1-5-2: Functional configuration of second communication apparatus 200
  1-5-3: (Modified example) How to obtain packet length
2: Second Embodiment
 2-1: Packet length modification method
 2-2: Functional configuration of communication apparatus
  2-2-1: Functional configuration of first communication apparatus 300
  2-2-2: Functional configuration of second communication apparatus 400
3: Third Embodiment
 3-1: Functional configuration of communication apparatus
  3-1-1: Functional configuration of first communication apparatus 500
  3-1-2: Functional configuration of second communication apparatus 600
 3-2: Hardware configuration of each communication apparatus
 3-3: (Modified example) Hardware configuration of each communication apparatus
 3-4: Flow of data read/write processing
 3-5: Transmission method including dynamic packet length modification processing
4: Addendum
 4-1: Detection method of soft decision data
  4-1-1: Circuit configuration of sampling clock generation section 800
  4-1-2: Circuit configuration of soft decision baseband signal generation section 820

4-1-3: Circuit configuration of data generation section 830

1: First Embodiment

The first embodiment of the present invention will be described. This embodiment relates to a method in which an indicator to evaluate communication condition is calculated and packet length is dynamically modified based on the indicator.

When performing wireless communication, data may be divided into a plurality of blocks and transmitted. This is because, the larger the amount of data, the higher the possibility that an error occurs in a data stream is. When an error occurs in a data series, the data is repeatedly retransmitted until correct data is received, and finally, the correct data is received. However, when a communication path condition is bad, correct data is difficult to be received even if the data is retransmitted many times. As a result, the communication time becomes long, so that users' convenience is hampered. Therefore, a method is used in which data is divided into small blocks and transmitted so that correct data can be received even when a communication path condition is bad.

However, when the data is divided into blocks, a time interval is generated after a block is transmitted and before the next block is transmitted. Therefore, when the data is divided into too many blocks, the time intervals increase. As a result, the communication time becomes long as the time intervals increase, so that users' convenience is hampered. Therefore, to increase users' convenience by shortening the communication time, it is desired to appropriately evaluate the communication path condition, divide the data into appropriate lengths in accordance with the communication path condition, and transmit the data. Responding to a request as described above, this embodiment provides a method for appropriately evaluating a communication path condition, and a method for dividing data into appropriate lengths in accordance with the evaluation result.

1-1: System Configuration

First, a configuration of a communication system 10 according to this embodiment will be briefly described with reference to FIG. 1. FIG. 1 is an illustration showing a schematic configuration of the communication system 10 according to this embodiment. Basic configuration of communication systems 20 and 30 described below is substantially the same as that of the communication system 10.

As shown in FIG. 1, the communication system 10 includes a first communication apparatus 100 and a second communication apparatus 200. The first communication apparatus 100 can transmit data to the second communication apparatus 200. Further, the second communication apparatus 200 can transmit data to the first communication apparatus 100. A communication path through which data is transmitted from the first communication apparatus 100 to the second communication apparatus 200 is represented as CH12. In the same way, a communication path through which data is transmitted from the second communication apparatus 200 to the first communication apparatus 100 is represented as CH21.

Usually, channel characteristics of the communication channel CH12 and channel characteristics of the communication channel CH21 are different. However, when the first communication apparatus 100 and the second communication apparatus 200 are installed in places with a fine view, the channel characteristics of the communication channels CH12 and CH21 may be assumed to be the same. In the first embodiment, an evaluation method of the communication condition and a data division method based on an evaluation result of the evaluation method will be described presuming that the channel characteristics of the communication channels CH12 and CH21 can be assumed to be the same. Of course, these methods can be extended to deal with a case in which the channel characteristics of the communication channels CH12 and CH21 are different. Such extension will be explained in a second and third embodiments described below.

1-2: Retransmission Control Method and Data-Divided Transmission Method

Figure 2:
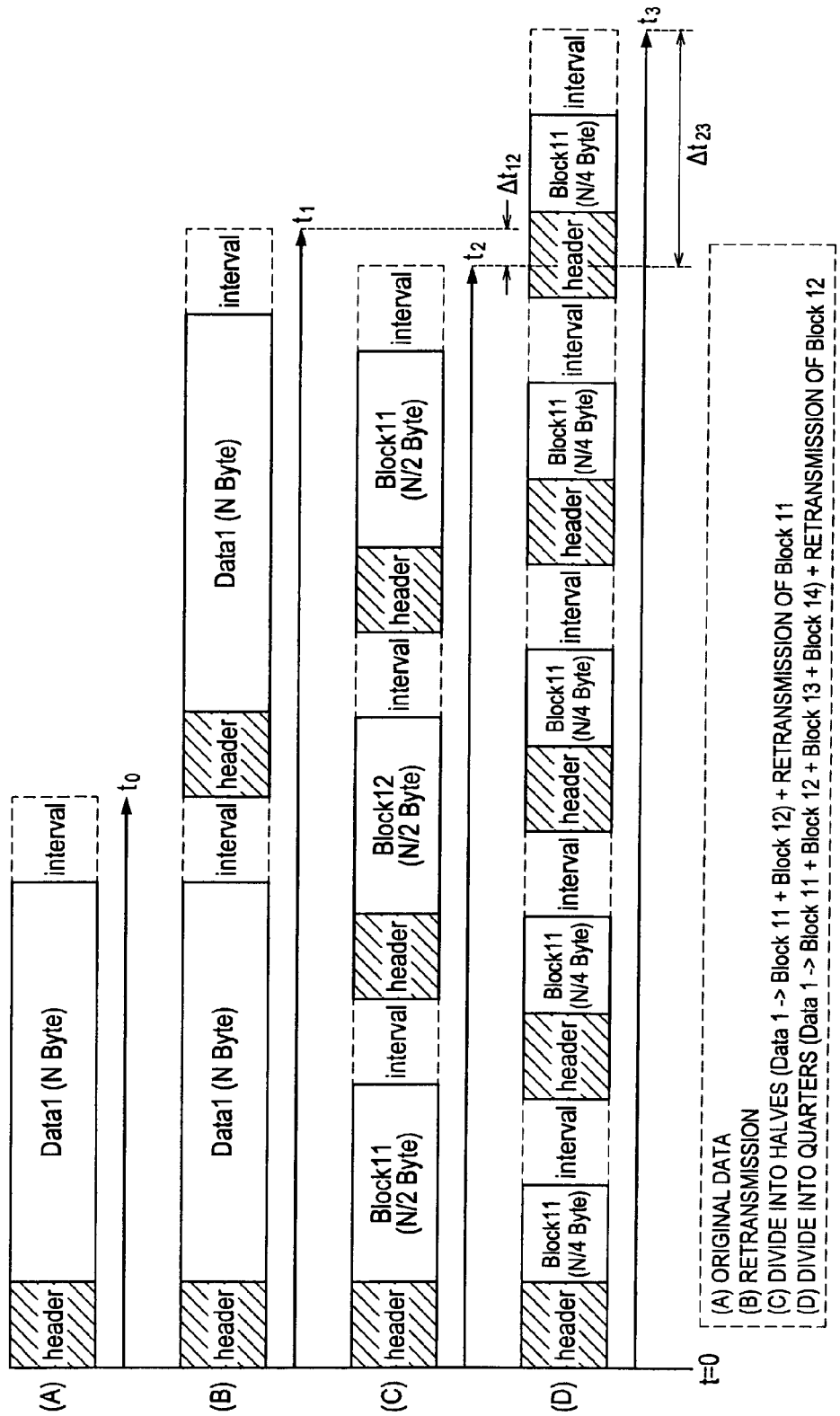
FIG. 2 shows an outline of a retransmission control method and a data-divided transmission method.

Here, a data retransmission control method and a data-divided transmission method will be briefly described with reference to FIG. 2. FIG. 2 is an illustration for explaining the data retransmission control method and the data-divided transmission method. Packet configurations and communication times shown in FIG. 2 are an example.

Part (A) in FIG. 2 shows a packet configuration for transmitting the original data to be divided without dividing the original data. Also, part (A) shows a communication time t0 used to transmit the data without dividing the data. Part (B) in FIG. 2 shows a communication time t1 used to retransmit the data without dividing the data. On the other hand, part (C) in FIG. 2 shows a packet configuration for transmitting the data by dividing the data into halves and a communication time t2 used to retransmit one of divided blocks. In a similar way, part (D) in FIG. 2 shows a packet configuration for transmitting the data by dividing the data into quarters and a communication time t3 used to retransmit one of divided blocks.

As shown in part (A), a case in which data of N bytes is transmitted is considered. As described above, to transmit this data, the communication time t0 is used, which is a total time of data transmission time, header transmission time, and time interval. If an error is detected in a top portion of the data which is located just after the header, as a countermeasure, it is considered that retransmission (B), retransmission by dividing data into halves (C), or retransmission by dividing data into quarters (D) is performed. As shown in part (B), when performing retransmission, the time t1 which is used to transmit data successfully is two times (t1=2*t0) the time used when not performing retransmission.

On the other hand, when transmitting data by dividing the data into halves (C), only the first half of the divided data has to be transmitted, so that the time t2 used to transmit the data is only 1.5 times the time used when not performing retransmission. However, the time used to transmit the headers and the time intervals are three times longer. However, the total time t2 which is the sum of the time used to transmit the headers and the time intervals is shorter than the time used when retransmitting the data without dividing the data (A) by a time Δt12.

When transmitting data by dividing the data into quarters (D), only the first half of the divided data has to be transmitted, so that the time t3 used to transmit the data is only 1.25 times the time used when not performing retransmission. However, the time used to transmit the headers and the time intervals are four times longer. Therefore, the total time t3 which is the sum of the time used to transmit the headers and the time intervals is longer than the time used when retransmitting the data without dividing the data (A). From these results, in the example of FIG. 2, it is found that, when transmitting data by dividing the data into halves, the total time used for transmission is the shortest.

In this way, an appropriate data length is determined depending on the length of the data to be transmitted, the lengths of the header and the time interval, the data division number, the number of retransmission times, and the like. Therefore, instead of simply repeating retransmission in accordance with a communication path condition, by transmitting the data by dividing the data into appropriate lengths in accordance with the communication path condition, the total communication time can be shortened. Therefore, hereinafter, a method for appropriately evaluating the communication path condition, and a method for determining the length of the divided data by using the evaluation result will be described in order. The communication path condition can be evaluated by estimating transmission error rate. Therefore, a method in which the transmission error rate can be estimated with relatively simple configuration will be described.

1-3: Estimation Method of Transmission Error Rate

Figure 3:
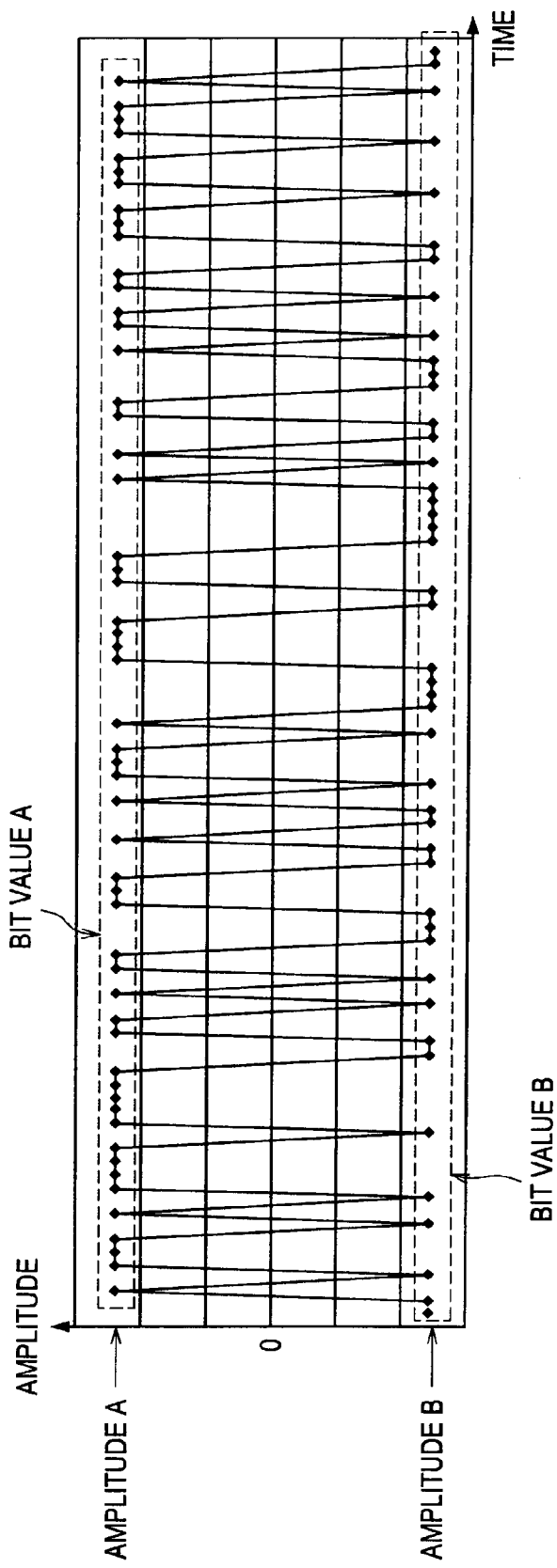
FIG. 3 shows an example of a signal waveform when transmitting a digitally modulated signal.

First, refer to FIG. 3. FIG. 3 schematically shows a signal waveform of a digitally modulated signal when being transmitted. The digitally modulated signal is not affected by the communication channel CH12 when being transmitted. Therefore, an amplitude value of the digitally modulated signal is an amplitude A or an amplitude B. If the communication channel CH12 is an ideal transmission path without any noise, a signal waveform of the digitally modulated signal when being received is as shown in FIG. 3. However, actually, noises are added to the digitally modulated signal in the communication channel CH12, so that the signal waveform of the digitally modulated signal when being received is as shown in FIG. 4.

Figure 4:
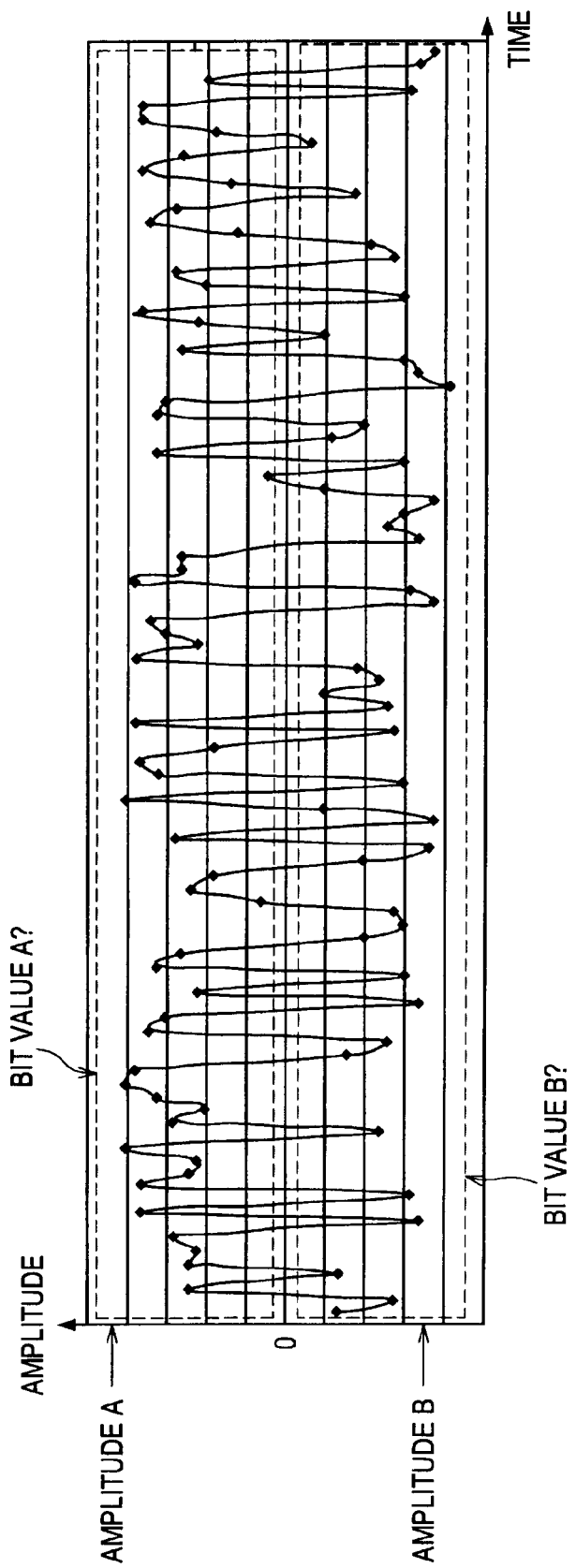
FIG. 4 shows an example of a signal waveform when receiving the digitally modulated signal.

FIG. 4 schematically shows a signal waveform of the digitally modulated signal when being received. The signal waveform shown in FIG. 4 can be obtained by performing analog-digital conversion on the received signal, or performing predetermined soft decision processing on the received signal. Specifically, FIG. 4 is an example of a signal waveform represented by soft decision data (hereinafter also referred to as "amplitude value") of the digitally modulated signal when being received. The horizontal axis is a time axis representing the number of data clock cycles. The signal waveform of FIG. 4 is different from that of FIG. 3, and includes a number of values between the amplitude A and the amplitude B by being affected by noises in the transmission path.

The value of the soft decision data represents the probability of hard decision data obtained by determining the sign of each amplitude value. Therefore, it is difficult to restore the original data correctly from a signal waveform including large changes in amplitude value over time as shown in FIG. 4. For example, when the soft decision data is near zero, it is difficult to determine whether the hard decision data, which is obtained from the sign of the soft decision data, is correct or not. However, by statistically analyzing the soft decision data, it is possible to estimate probability of transmission error in the communication path CH12. For example, when enlarging the time range of the signal waveform shown in FIG. 4, a distribution diagram as shown in FIG. 5 can be obtained.

Figure 5:
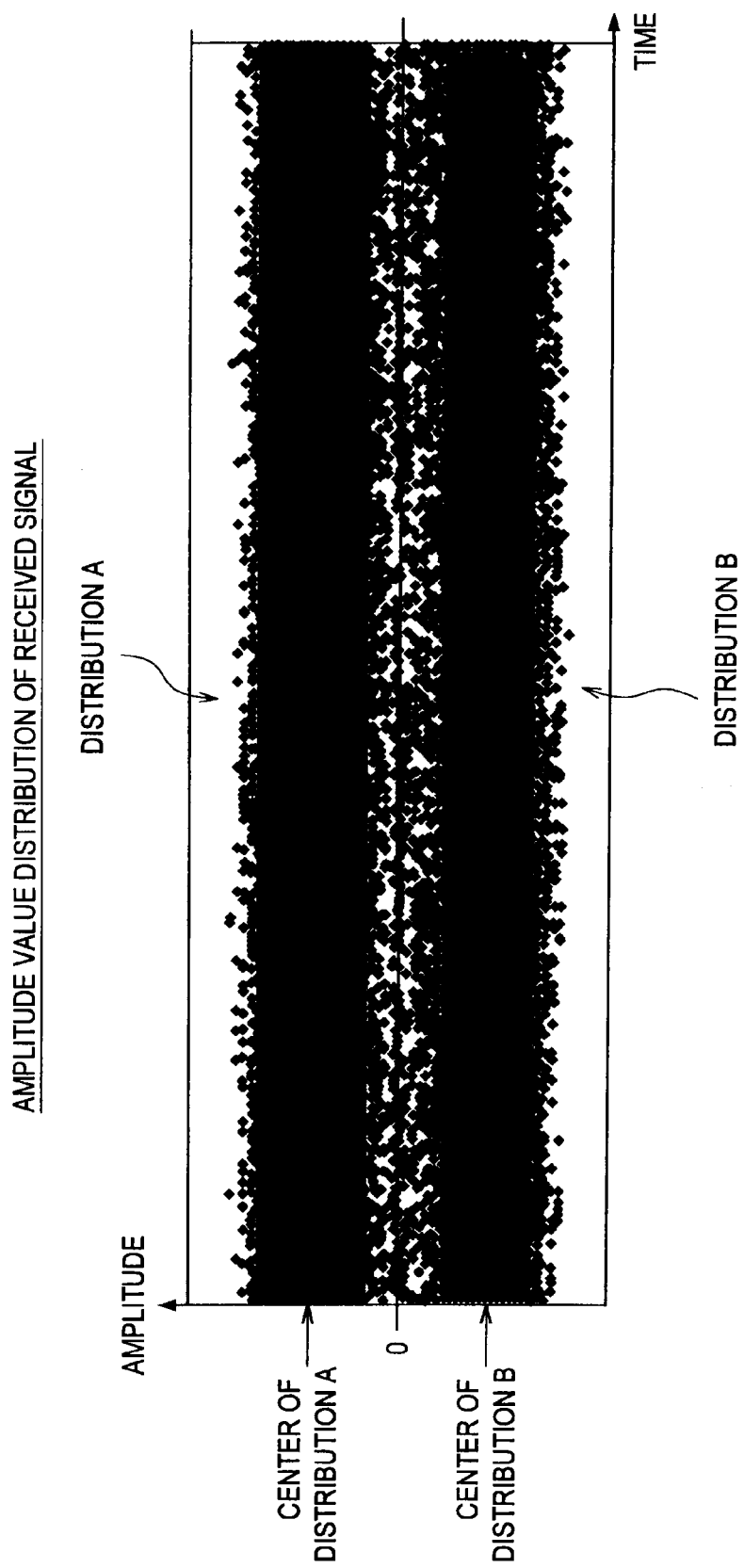
FIG. 5 shows a distribution of soft decision data (amplitude values) obtained from a received signal.
Figure 6:
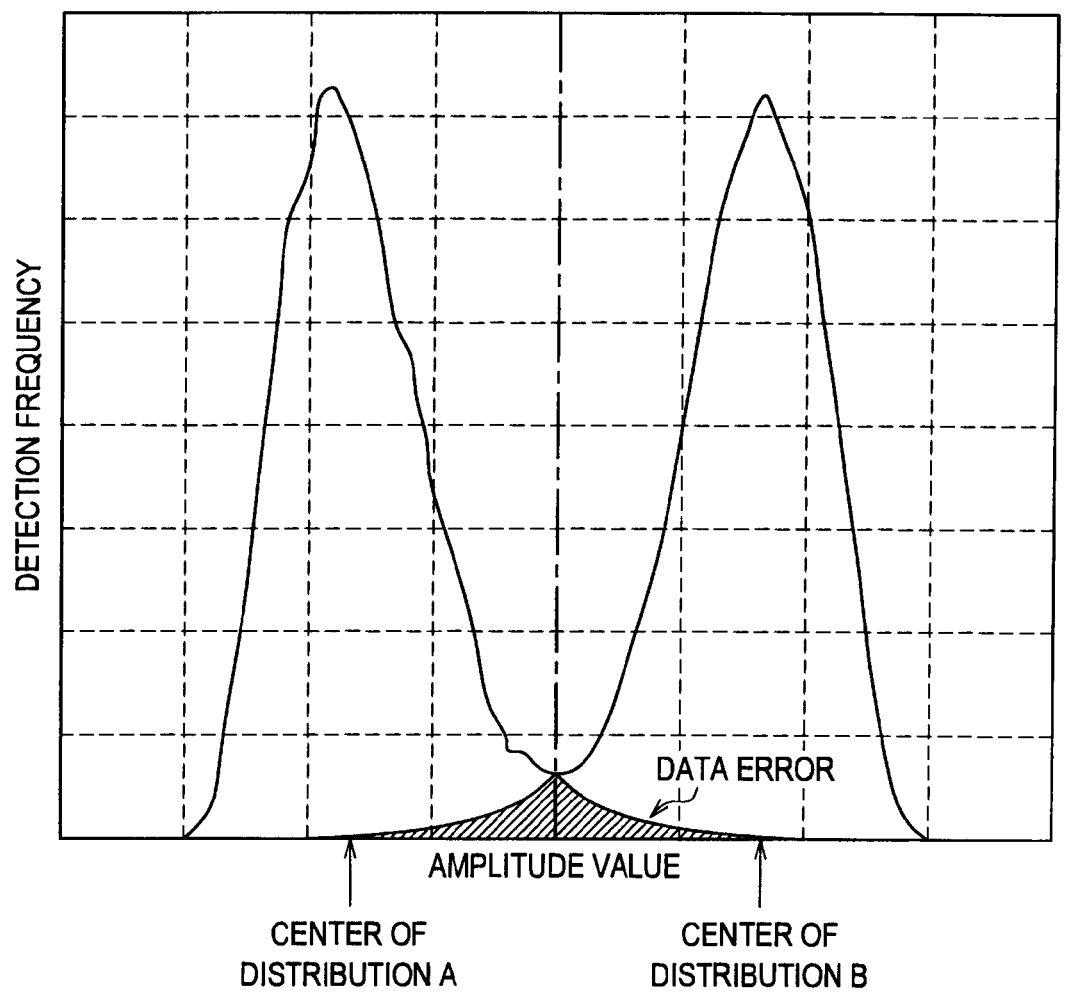
FIG. 6 shows a histogram of soft decision data (amplitude values) obtained from a received signal.

As will be appreciated from the distribution diagram in FIG. 5, there are two centers of distribution (center of distribution A, center of distribution B) in the soft decision data obtained from the received digitally modulated signal. There are two distributions (distribution A, distribution B) from each center of distribution. However, a set of the soft decision data included in the distribution A and a set of the soft decision data included in the distribution B are not independent sets. Therefore, when representing more correctly, there is one distribution having two centers of distribution A and B. To clarify the characteristics of the distribution, FIG. 6 shows a histogram of the soft decision data. In FIG. 6, the vertical axis is detection frequency of each soft decision data, and the horizontal axis is the value of the soft decision data.

As shown in FIG. 6, from the distribution diagram shown in FIG. 5, a histogram having peaks at the amplitude value corresponding to the center of distribution A and the amplitude value corresponding to the center of distribution B can be obtained. A chain line and a shaded area in FIG. 6 are added for explanation. As described above, the hard decision data is obtained by determining the sign of the soft decision data. Therefore, when soft decision data which should have a positive sign has a negative sign, hard decision data obtained based on the soft decision data will be an error. In the histogram of FIG. 6, when a point of soft decision data which should be included in the distribution A distributed from the center of distribution A is included in the distribution B distributed from the center of distribution B, the point of the soft decision data will be an error.

Therefore, if a ratio in which a set of soft decision data corresponding to the above error occupies in the entire set of soft decision data distributed from each center of distribution can be calculated, the transmission error rate can be calculated. An entire amount of the soft decision data can be calculated by the area of the histogram. On the other hand, to estimate an amount of soft decision data corresponding to the error, some technique is used. Here, refer to the histogram of FIG. 6 again. The histogram of FIG. 6 has an approximate shape formed by combining a normal distribution (hereinafter "normal distribution A") centered on the center of distribution A and a normal distribution (hereinafter "normal distribution B") centered on the center of distribution B. The histogram of FIG. 6 has a mirror symmetric shape with respect to the amplitude value 0.

Therefore, by approximating the histogram by the normal distribution A centered on the center of distribution A, and calculating the area in the approximated normal distribution A protruding to an area having an amplitude value smaller than the amplitude value 0 (an area near the center of distribution B), an amount of soft decision data corresponding to the error can be estimated from the protruding area. A shaded area shown in FIG. 6 is the protruding area of the normal distribution A (and normal distribution B) fitted to the histogram. Therefore, by obtaining a ratio between the area surrounded by the histogram and the shaded area, the transmission error rate can be estimated. Conversely, an indicator corresponding to the transmission error rate can be calculated based on variance value of the soft decision data obtained from a part of a histogram approximated by a normal distribution based on one of centers of distribution and a position of the center of distribution (average value of each distribution).

Usually, to obtain the transmission error rate of the received signal, the original data has to be known in advance by the receiver. Also, to obtain the transmission error rate with a high degree of accuracy, some amount of data may be required. However, the above average value and variance value can be calculated without knowing the original data. Further, these values can be easily obtained by using data in a short interval. In view of these advantages, in this embodiment, a statistical indicator is used, which is determined based on the above average value and variance value and used to evaluate the communication quality of the transmission path. Hereinafter, an entire flow from the receiving process of the signal used for calculating the indicator to the transmitting process of the signal including the divided data will be described, and apparatus configurations for realizing processing of each process will be described in order.

1-4: Packet Length Modification Method

Figure 7:
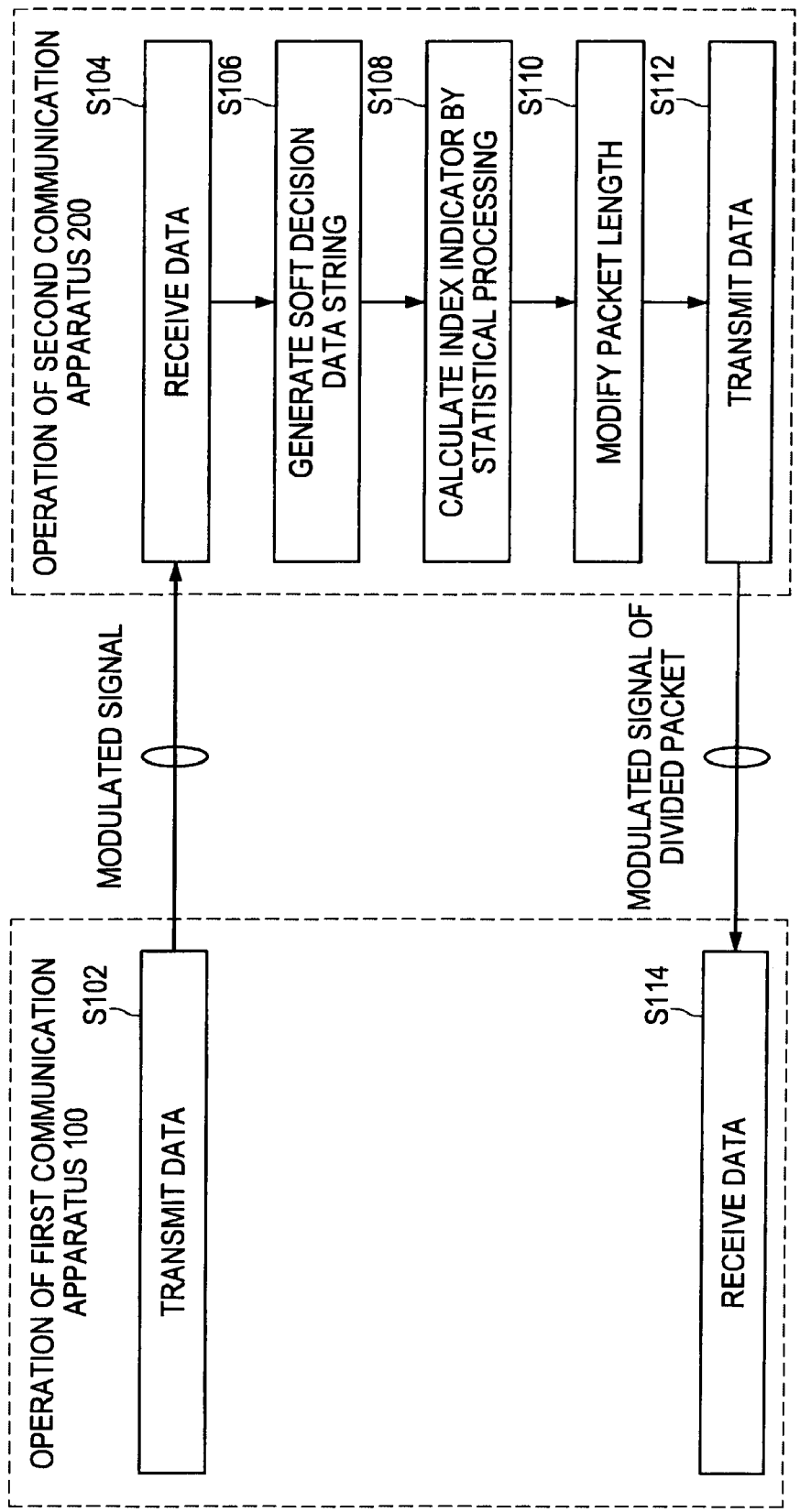
FIG. 7 shows a packet length modification method according to the first embodiment.

First, an entire process flow including packet length modification processing according to this embodiment will be described with reference to FIG. 7. FIG. 7 is an illustration showing the entire process flow including the packet length modification processing according to this embodiment. The processing of each step shown in FIG. 7 is performed by the first communication apparatus 100 or the second communication apparatus 200 included in the communication system 10.

As shown in FIG. 7, first, data is transmitted from the first communication apparatus 100 to the second communication apparatus 200 (S102). The data transmitted in step S102 is arbitrary data. The data to be transmitted is modulated by a predetermined modulation method, and transmitted to the second communication apparatus 200 as a modulated signal. Next, the second communication apparatus 200 receives the data (modulated signal) transmitted from the first communication apparatus 100 (S104). Next, the second communication apparatus 200 generates a soft decision data string from the received modulated signal (S106). The soft decision data string can be detected, for example, by using an analog-digital converter or a soft decision data detection method described below.

Next, the second communication apparatus 200 performs predetermined statistical processing using the soft decision data string generated in step S106, and calculates an indicator for evaluating the communication condition in the communication channel CH12 (S108). This indicator indicates a degree of variation in the soft decision data string generated in step S106. As described above, an evaluation indicator corresponding to the transmission error rate can be calculated based on the degree of variation (for example, variance value) in the soft decision data. In step S108, such an evaluation indicator is calculated. For example, an indicator which becomes a large value when the communication condition of the communication channel CH12 is bad, and becomes a small value when the communication condition is good is calculated.

Next, the second communication apparatus 200 modifies the packet length of the data series to be transmitted based on the indicator calculated in step S108 (S110). For example, the second communication apparatus 200 performs a modification to shorten the packet length when the value of the indicator is large, and performs a modification to lengthen the packet length when the value of the indicator is small. The second communication apparatus 200 divides the data by the modified packet length, and transmits the data to the first communication apparatus 100 by packetizing each divided data (S112). The packet of each divided data (hereinafter, divided packet) is modulated by a predetermined modulation method, and transmitted as a modulated signal. The data of the divided packet is received by the first communication apparatus 100 (S114).

When receiving all the divide packets, the first communication apparatus 100 combines the divided packets to restore the original data. By using such a method, the packet length in the transmission system can be dynamically modified in accordance with the transmission path condition. As a result, even when channel characteristics of the communication channel CH12 change, data can be dividedly transmitted by an appropriate packet length, so that the communication time is shortened. As a result, the convenience of the user can be improved.

Regarding the packet length modification method according to this embodiment, the general process flow has been described. The method described above can be applied when the channel characteristics of the communication channels CH12 and CH21 can be assumed to be the same. A case in which the channel characteristics of the communication channels CH12 and CH21 are different will be described in detail in a second embodiment and a third embodiment below. Next, functional configurations of each communication apparatus for realizing the above method will be described.

1-5: Functional Configuration of Communication Apparatus

Hereinafter, functional configurations of the first communication apparatus 100 and the second communication apparatus 200 included in the communication system 10 which can realize the above method will be described in detail. The technical features of this embodiment are mainly included in the functional configuration of the second communication apparatus 200.

1-5-1: Functional Configuration of First Communication Apparatus 100

First, a functional configuration of the first communication apparatus 100 will be described with reference to FIG. 8. FIG. 8 shows a functional configuration example of the first communication apparatus 100 according to this embodiment.

Figure 8:
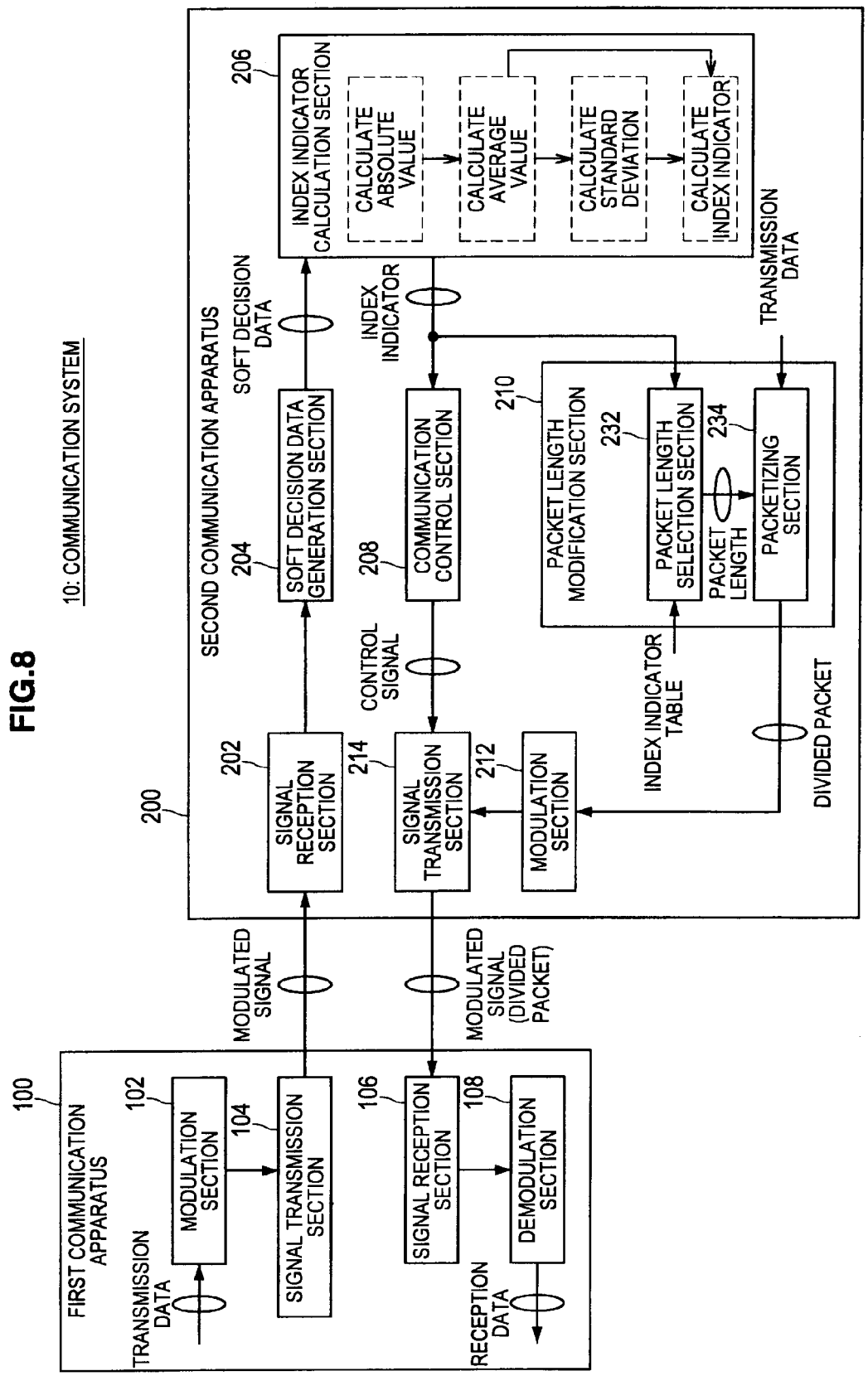
FIG. 8 shows a functional configuration example of a communication apparatus according to the first embodiment.

As shown in FIG. 8, the first communication apparatus 100 mainly includes a modulation section 102, a signal transmission section 104, a signal reception section 106, and a demodulation section 108. As described above, a main role of the first communication apparatus 100 according to this embodiment is to transmit data to the second communication apparatus 200, and receive data transmitted from the second communication apparatus 200.

First, transmission data is input into the modulation section 102. In the modulation section 102, the transmission data is modulated based on a predetermined modulation method, and a modulated signal is generated. As the predetermined modulation method, for example, the phase shift keying method, the amplitude modulation method, and the like are used. The modulated signal generated by the modulation section 102 is input into the signal transmission section 104. When the modulated signal is input, the signal transmission section 104 transmits the modulated signal to the second communication apparatus 200.

As described above, in the second communication apparatus 200, the indicator is calculated based on the received modulated signal, and the divided packet is generated by a packet length modified based on the indicator. This divided packet is transmitted from the second communication apparatus 200 to the first communication apparatus 100 as a modulated signal. The first communication apparatus 100 receives the modulated signal including the divided packet by the signal reception section 106. The modulated signal received by the signal reception section 106 is input into the demodulation section 108. In the demodulation section 108, divided data included in each divided packet is read, and all the divided data are combined and the original data is restored.

So far, the functional configuration of the first communication apparatus 100 has been described.

1-5-2: Functional Configuration of Second Communication Apparatus 200

Next, a functional configuration of the second communication apparatus 200 will be described with reference to FIG. 8. FIG. 8 shows a functional configuration example of the second communication apparatus 200 according to this embodiment.

As shown in FIG. 8, the second communication apparatus 200 mainly includes a signal reception section 202, a soft decision data generation section 204, an indicator calculation section 206, a communication control section 208, a packet length modification section 210, a modulation section 212, and a signal transmission section 214. The packet length modification section 210 includes a packet length selection section 232 and a packetizing section 234.

As described above, when the modulated signal is transmitted from the first communication apparatus 100, the modulated signal is received by the signal reception section 202. The modulated signal received by the signal reception section 202 is input into the soft decision data generation section 204. When the modulated signal is input, the soft decision data generation section 204 generates soft decision data from the modulated signal. The soft decision data generation section 204 detects each bit value as a value having two or more bits (soft decision data value) by using, for example, analog-digital conversion or a soft decision data detection method (refer to FIGS. 27, 28, and 29) described below. For example, the soft decision data generation section 204 can detect a soft decision data string having amplitude values as shown in FIG. 4.

The soft decision data string generated by the soft decision data generation section 204 is input into the indicator calculation section 206. When the soft decision data string is input, the indicator calculation section 206 counts the number of data values (hereinafter, parameter ERNUM) included in the soft decision data string. The indicator calculation section 206 also calculates absolute values of each soft decision data. The indicator calculation section 206 sums up the absolute values of each soft decision data and calculates an absolute value sum (ERABS). Further, the indicator calculation section 206 calculates an average of the absolute values (hereinafter, absolute value average AVE) by using the parameter ERNUM and the absolute value sum ERABS. Also, the indicator calculation section 206 calculates square values of each soft decision data and calculates the sum of the square values (hereinafter, square value sum ERSQA).

The indicator calculation section 206 calculates a standard deviation (STDEV) of the soft decision data string by using the parameter ERNUM, the square value sum ERSQA, and the absolute value sum ERABS. The absolute value average AVE and the standard deviation STDEV are calculated based on the formulas (1) and (2) below. When the absolute value average AVE and the standard deviation STDEV are calculated, the indicator calculation section 206 calculates the indicator (SDI) based on the formula (3) below.

$$AVE = ERABS/ERNUM \quad (1)$$

$$STDEV = \{ERSQA/ERNUM - (ERABS/ERNUM)^2\}^{0.5} \quad (2)$$

$$SDI = STDEV/(2*AVE) \quad (3)$$

Figure 9:
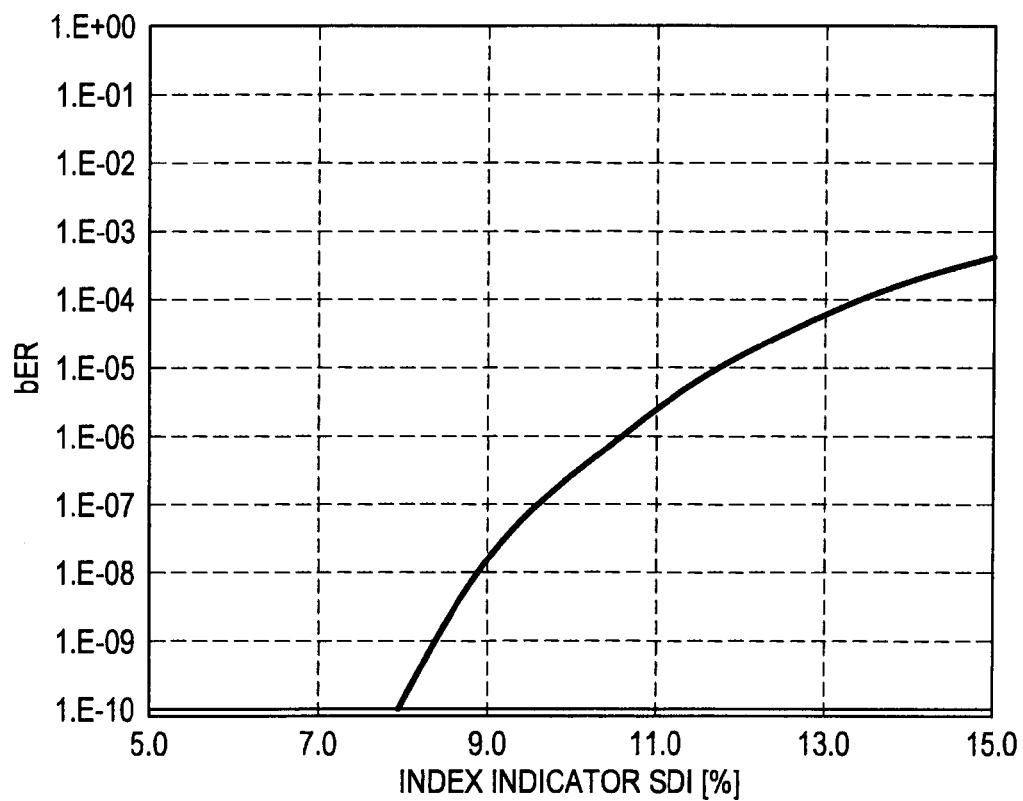
FIG. 9 shows a relationship between indicators calculated by the communication apparatus according to the first embodiment and bit error rate.

As already described with reference to FIG. 6, there is a correlation between the distribution of the soft decision data string and the transmission error rate. Therefore, the indicator SDI based on the standard deviation STDEV (or the variance value STDEV2) corresponding to the degree of variation in the soft decision data string can be used as an evaluation value for evaluating a communication condition of a transmission path. Actually, there is a relationship as shown in FIG. 9 between the indicator SDI and a bit error rate (bER). From FIG. 9, it may be understood that there is a one-on-one relationship between the indicator SDI and the bit error rate (bER).

Here, the relationship between the indicator SDI and the bit error rate (bER) will be examined in more detail. As already described above, the bit error rate bER can be estimated from the area of the histogram shown in FIG. 6. Specifically, the value of the bit error rate bER can be estimated by obtaining an area ratio of a portion, which protrudes to the negative (or positive) area, in the normal distribution (average value E, variance $\sigma^2$) of the soft decision data whose center of distribution is located in the positive (or negative) area. Considering the above, when representing the value of the bit error rate bER by using the above indicator SDI, the value is represented by the formula (4) below. The term erfc { . . . } represents a cumulative error complementary function.

$$bER = (1/2) * \text{erfc}\{1/(2^{1.5} * SDI)\} \quad (4)$$
$$= (1/2) * \text{erfc}\{E/(2^{0.5} * \sigma)\}$$

Also from the above formula (4), it is possible to understand that there is a one-on-one relationship between the indicator SDI and the bit error rate (bER). The indicator SDI calculated in that way by the indicator calculation section 206 is input into the communication control section 208 and the packet length modification section 210 (refer to FIG. 8).

When the indicator SDI is input, the communication control section 208 stops data transmission or re-starts the stopped data transmission in accordance with the value of the indicator SDI. For example, when the indicator SDI is greater than a predetermined value, the communication control section 208 determines that the communication environment deteriorates, and inputs a control signal for stopping the data transmission into the signal transmission section 214. On the other hand, when the indicator SDI is smaller than a predetermined value, the communication control section 208 determines that the communication environment improves, and inputs a control signal for re-starting the data transmission into the signal transmission section 214.

The above predetermined values are values of the indicator SDI for coping with a communication condition in which, even when modifying the packet length, data is difficult to transmit in a predetermined time period. By making such a configuration, it is possible to stop the data transmission when the communication environment deteriorates, and re-start the data transmission after a random or a predetermined time has passed, or after the communication environment has improved. When there are many communication devices nearby which use the same channel, data transmission timing may need to be appropriately adjusted. In such a situation, when each communication device calculates the above indicator SDI, and controls transmission timing based on the indicator SDI, the data transmission timing can be adjusted more efficiently.

When the indicator SDI is input, the packet length modification section 210 modifies the packet length in accordance with the value of the indicator SDI, and generates a divided packet by the modified packet length. As described above, the packet length modification section 210 includes the packet length selection section 232 and the packetizing section 234.

The packet length selection section 232 is a means for selecting an appropriate packet length in accordance with the input indicator SDI. On the other hand, the packetizing section 234 is a means for dividing transmission data by the packet length selected by the packet length selection section 232, and generating a divided packet by packetizing the divided transmission data.

Figure 10:
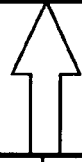
FIG. 10 shows a relationship between indicators calculated by the communication apparatus according to the first embodiment and bit error rate, and a configuration example of an indicator table.

First, the indicator SDI is input into the packet length selection section 232. When the indicator SDI is input, the packet length selection section 232 refers to the indicator SDI and an indicator table (refer to FIG. 10) in which the indicators SDI and predetermined packet lengths are associated with each other, and selects an appropriate packet length. Here, a configuration of the indicator table will be described with reference to FIG. 10. FIG. 10 is an illustration showing a configuration example of the indicator table according to this embodiment.

The above indicator table is set based on the relationship between the indicator SDI and the bit error rate (bER). As already described above, there is a one-on-one relationship between the indicator SDI and the bit error rate bER. When the bit error rate bER is determined, an error occurrence rate P (without error correction) when a packet of a predetermined size is transmitted can be estimated based on the formula (5) below. In the formula (5) below, p is the bit error rate bER calculated by the above formula (4). On the other hand, the error occurrence rate P is a sum of probabilities in which k (k>0) data pieces become error in n data pieces in the packet. The values 1024 [Byte] to 64 [Byte] represented in the upper most fields indicate packet lengths of the transmission data.

$$P \cong \sum_{k=1}^{n} {}_nC_k p^k (1-p)^{n-k} = 1 - (1-p)^n \quad (5)$$

Although the indicator table of table (B) is set from the error occurrence rate P of table (A), an allowable error occurrence rate P is determined depending on an application, a communication method, and the like. Therefore, the indicator table is set to appropriately adjusted values depending on the application, the communication method, and the like so that the packet length is short when the value of the error occurrence rate P is large. For example, the indicator table is set by using values shown in table (B). By using the indicator table set in this way, it is expected that the total communication time used to transmit a large data can be shortened.

Refer to FIG. 8 again. The packet length selection section 232 refers to the indicator table as described above, and selects an packet length corresponding to the indicator SDI calculated by the indicator calculation section 206. The packet length information selected by the packet length selection section 232 is input into the packetizing section 234. Further, transmission data to be transmitted from the second communication apparatus 200 to the first communication apparatus 100 is input into the packetizing section 234. When the packet length information and the transmission data are input, the packetizing section 234 divides the transmission data based on the packet length information, and generates divided packet by packetizing each transmission data (divided data) having been divided. The divided packet generated by the packetizing section 234 is input into the modulation section 212.

When the divided packet is input from the packet length modification section 210 (packetizing section 234), the modulation section 212 modulates the divided packet based on a predetermined modulation method, and generates a modulated signal. The modulated signal generated by the modulation section 212 is input into the signal transmission section 214. When the modulated signal is input, the signal transmission section 214 transmits the input modulated signal to the first communication apparatus 100. The signal transmission section 214 stops the transmission of the modulated signal or re-starts the transmission in accordance with the control signal input from the communication control section 208. The signal transmission section 214 may be configured to transmit a test packet for checking the communication condition in the transmission path to the first communication apparatus 100 when the control signal to stop the transmission is input from the communication control section 208.

So far, the functional configuration of the second communication apparatus 200 has been described. As described above, the technical feature of this embodiment is a configuration in which the indicator SDI is calculated based on statistic values of the soft decision data string obtained from the received modulated signal, and the packet length is modified in accordance with the indicator SDI. By making such a configuration, it is possible to evaluate the communication condition in the transmission path and generate the divided packet having an appropriate length according to the evaluation result, so that the total communication time to be used for transmitting entire data can be shortened. As a result, the convenience of the user improves.

1-5-3: (Modified Example)

How to Obtain Packet Length

Figure 11:
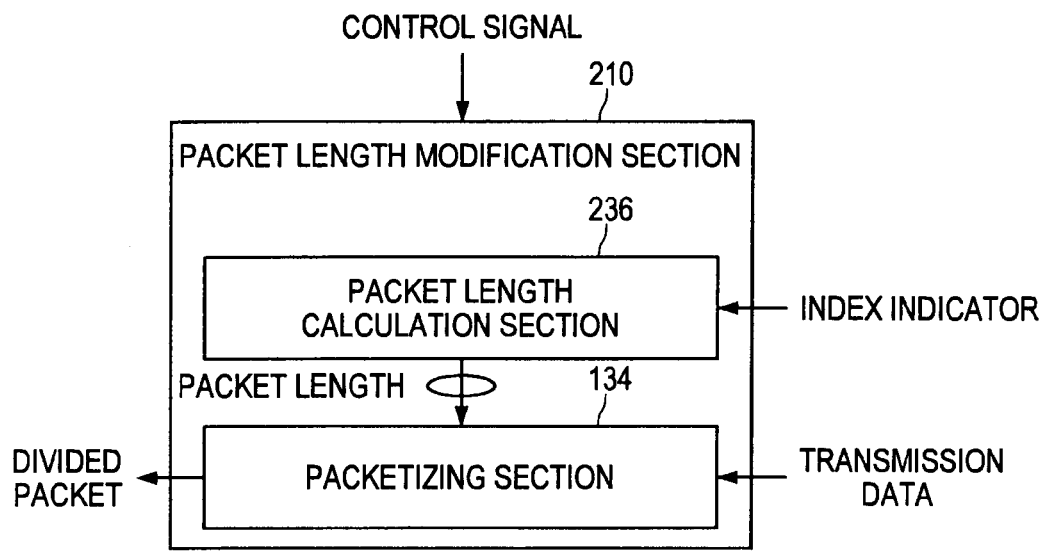
FIG. 11 shows a detailed functional configuration of a packet length modification section according to a modified example of the first embodiment.

So far, this embodiment has been described based on the method in which a packet length corresponding to the indicator SDI is selected based on a predetermined indicator table. However, when the indicator SDI is obtained, an expected value of the total communication time used to transmit data of n bits by divided packets of k bits can be calculated. Accordingly, a method for determining an appropriate packet length from the expected value of the total communication time can be considered. Therefore, this method is proposed as a modified example of this embodiment. When applying this method, the functional configuration of the packet length modification section 210 is modified as shown in FIG. 11. FIG. 11 is an illustration showing a functional configuration example of the packet length modification section 210 according to this modified example.

As shown in FIG. 11, the packet length modification section 210 includes a packet length calculation section 236 and the packetizing section 234. In other words, the packet length selection section 232 is replaced by the packet length calculation section 236. The functional configuration of the packetizing section 234 is the same as that of the first embodiment. Therefore, hereinafter a method for calculating the packet length by the packet length calculation section 236 will be described in detail.

To determine a packet length to reduce the total communication time to minimum, the header, the time interval, and the like have to be considered. Regarding the time lengths of the header, the time interval, and the like, there are a time t0 which is proportional to the packet length and a time t1 which is constant and independent from the packet length. The time t0, which is proportional to the packet length, includes the transmission time, an access time to an internal memory, and the like. For example, the total time to transmit a packet of 1 bit length is defined as t0. On the other hand, the constant time t1, which is used for every packet independent from the packet length, includes, for example, the time length of the header or the like.

When considering the time t0 and the time t1, the expected value of the total time used to transmit data of n bits by dividing the data into packets of k bits can be calculated based on the formula (6) below. Note that "p" represents the bit error rate bER, and [ . . . ] represents an integer portion of . . . .

$$\langle T(k) \rangle = (kt_0 + t_1)(1-p)^{-k}\left[\frac{n}{k}\right] \cong \left(\frac{t_0 + t_1/k}{(1-p)^k}\right)n \tag{6}$$

Figure 12:
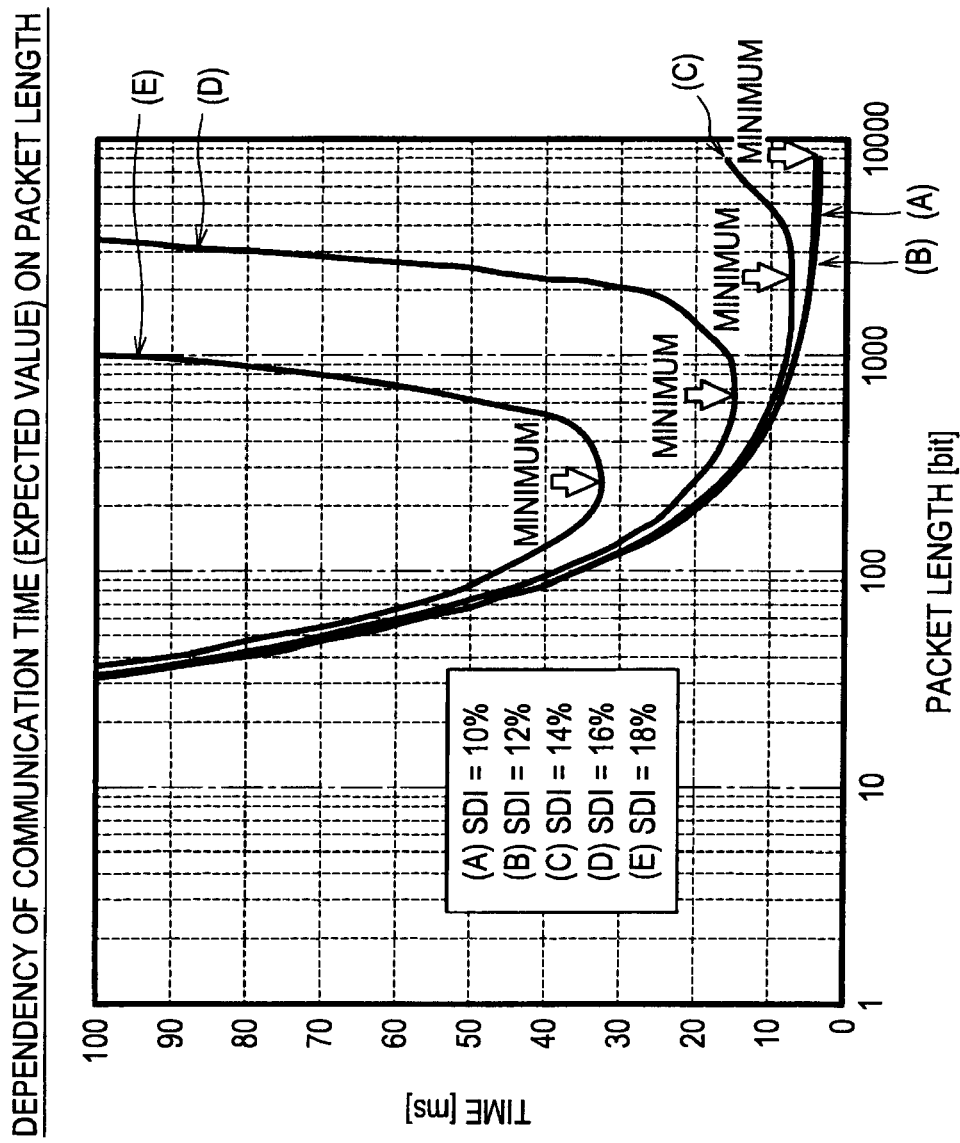
FIG. 12 shows a packet length determination method according to the modified example of the first embodiment.

When assuming that the time t0 is 400 [ns] which is proportional to the packet length, the time t1 is 0.4 [ms] which is used for every packet, and the packet length n is 1024 [Byte], the expected values of the total communication time calculated by using the above formula (6) are shown in FIG. 12. In FIG. 12, the vertical axis represents the time used to transmit a packet of length n, and the horizontal axis represents the packet length. In FIG. 12, five graphs (A) to (E) which are obtained by changing the value of indicator SDI are shown. In FIG. 12, the smaller the value of the vertical axis is, the better. Therefore, the optimal packet length is a packet length corresponding to the minimum point of each graph.

From the example of FIG. 12, it is understood that positions of the minimum points move to the side of shorter packet length as the indicator SDI becomes smaller ((A)→(E)). In other words, it is understood that, as the indicator SDI becomes smaller, the optimal packet length becomes shorter. To determine a position of such a minimum point, the expected value <T(k)> of the total time represented by the above formula (6) is differentiated by a variable k, and when the differential value (formula (7) below) becomes "0", the packet length k at the time is selected. As a result, the optimal packet length is determined by the arithmetic formula (8) below.

$$\frac{d\langle T(k)\rangle}{dk} \propto k^2 + \left(\frac{t_1}{t_0}\right)\cdot k + \left(\frac{t_1}{t_0}\right)\frac{1}{\log(1-p)} \tag{7}$$

$$k = \frac{1}{2}\left(-\frac{t_1}{t_0} \pm \sqrt{\left(\frac{t_1}{t_0}\right)^2 - \frac{4}{\log(1-p)}\left(\frac{t_1}{t_0}\right)}\right) \tag{8}$$

Figure 14:
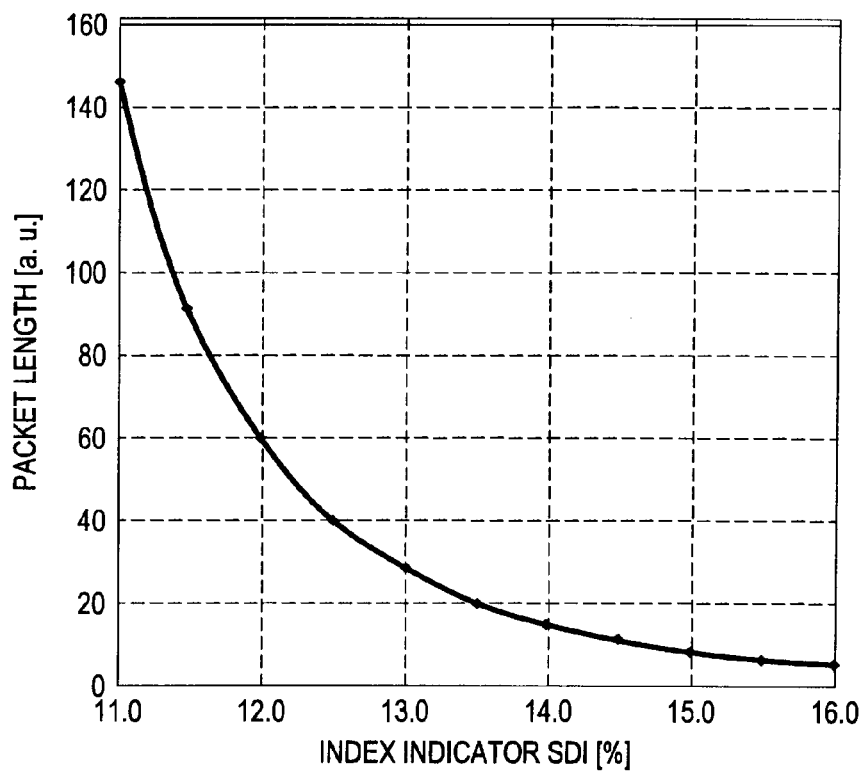
FIG. 14 shows a relationship between packet lengths determined based on the packet length determination method according to the modified example of the first embodiment and indicators.

Based on the above formula (8), a result calculated by using the same times t0 and t1 as those of the example in FIG. 12 is shown in tabular form in FIG. 13. The table in FIG. 13 is shown in graph form in FIG. 14. By calculating the packet length by the calculations described above, as illustrated in FIG. 13, the packet length is determined with high accuracy in accordance with the value of the indicator SDI. As shown in FIG. 14, since the optimal packet length smoothly changes as the indicator SDI changes, when employing this method, there is little drastic change in the packet length. Such a configuration can be realized by storing information of the arithmetic formula represented by the above formula (8) in the packet length calculation section 236.

So far, the configurations of the communication system 10 according to the first embodiment of the present invention, the first communication apparatus 100, and the second communication apparatus 200 including the modified example have been described in detail. By applying the above configurations, the communication condition of the transmission path can be appropriately evaluated, and the packet length can be dynamically modified in accordance with the evaluation result.

2: Second Embodiment

Next, the second embodiment of the present invention will be described. In the first embodiment described above, it is assumed that the communication conditions of the communication channels CH12 and CH21 are the same. Therefore, the indicator SDI is calculated based on the modulated signal transmitted from the first communication apparatus 100 to the second communication apparatus 200, and the indicator SDI is used as a base for determining the packet length of the packet transmitted from the second communication apparatus 200 to the first communication apparatus 100. However, the indicator SDI represents the communication condition of the communication channel CH12. Therefore, when the communication conditions of the communication channels CH12 and CH21 are different, the indicator SDI is not an appropriate base.

Accordingly, in the second embodiment of the present invention, a method is proposed in which an appropriate communication condition is evaluated and the packet length is modified in accordance with the evaluation result when the communication conditions of the communication channels CH12 and CH21 are different from each other.

2-1: Packet Length Modification Method

First, an entire process flow including the packet length modification processing according to this embodiment will be described with reference to FIG. 15. FIG. 15 is an illustration showing the entire process flow including the packet length modification processing according to this embodiment. Each step shown in FIG. 15 is realized by the first communication apparatus 300 or the second communication apparatus 400 included in the communication system 20 described below.

Figure 15:
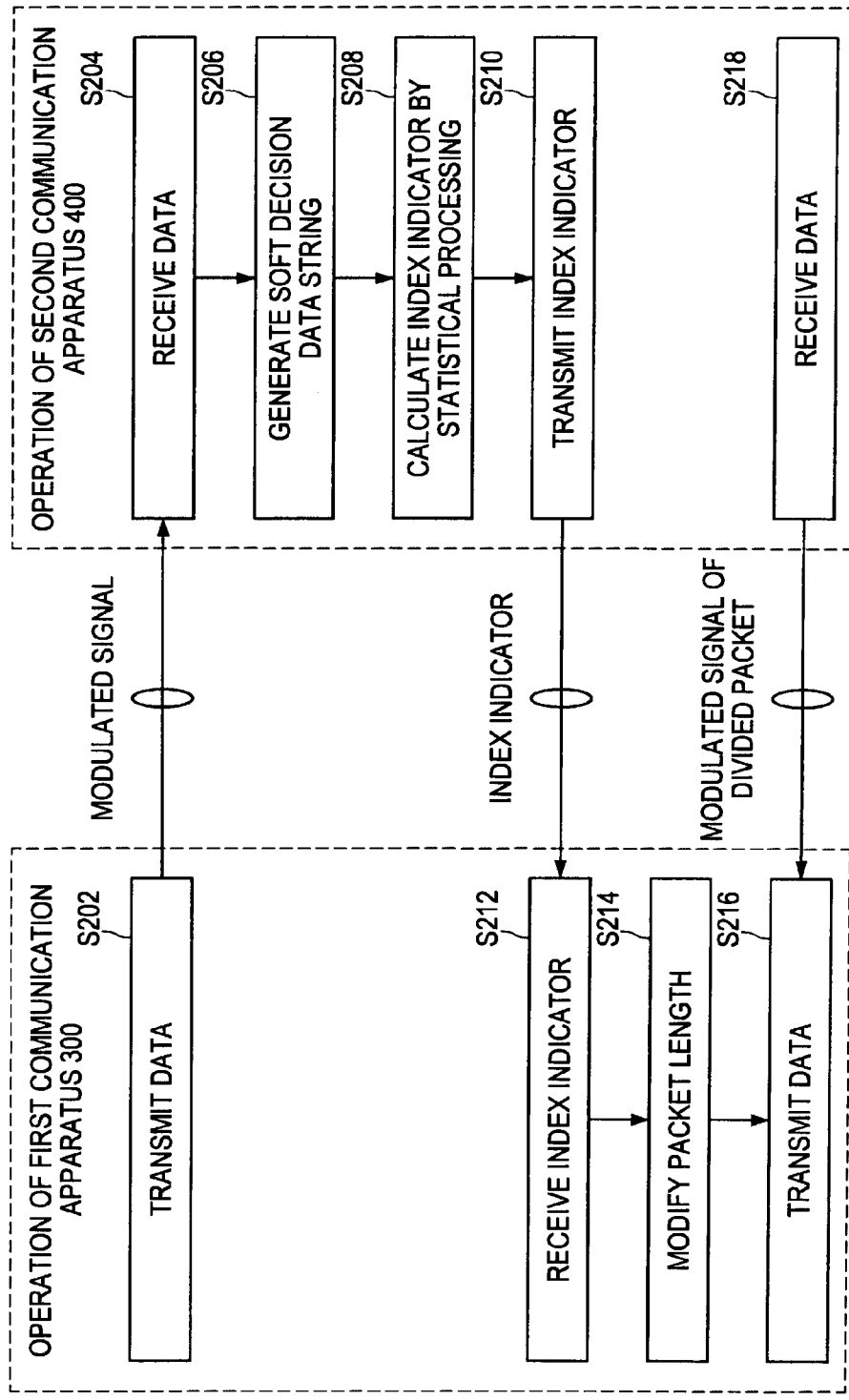
FIG. 15 shows a packet length modification method according to a second embodiment of the present invention.

As shown in FIG. 15, first, data is transmitted from first communication apparatus 300 to the second communication apparatus 400 (S202). The data transmitted in step S202 is arbitrary data. The data to be transmitted is modulated by a predetermined modulation method, and transmitted to the second communication apparatus 400 as a modulated signal. Next, the second communication apparatus 400 receives the data (modulated signal) transmitted from the first communication apparatus 300 (S204). Next, the second communication apparatus 400 generates a soft decision data string from the received modulated signal (S206). The soft decision data string can be detected, for example, by using an analog-digital converter or a soft decision data detection method described below.

Next, the second communication apparatus 400 performs predetermined statistical processing using the soft decision data string generated in step S206, and calculates an indicator for evaluating the communication condition in the communication channel CH12 (S208). This indicator indicates a degree of variation in the soft decision data string generated in step S206. As described above, an evaluation indicator corresponding to the transmission error rate can be calculated based on the degree of variation (for example, variance value) in the soft decision data. In step S208, such an evaluation indicator is calculated. For example, an indicator which becomes a large value when the communication condition of the communication channel CH12 is bad, and becomes a small value when the communication condition is good is calculated.

Next, the second communication apparatus 400 transmits the indicator calculated in step S208 to the first communication apparatus 300 (S210). Next, the first communication apparatus 300 receives the indicator transmitted from the second communication apparatus 400 (S212). Next, the first communication apparatus 300 modifies the packet length of the data series to be transmitted based on the indicator received in step S212 (S214). For example, the first communication apparatus 300 performs a modification to shorten the packet length when the value of the indicator is large, and performs a modification to lengthen the packet length when the value of the indicator is small. At this time, the indicator used by the first communication apparatus 300 to modify the packet length is an evaluation result of the communication condition of the communication channel CH12.

Therefore, an appropriate packet length is determined considering the communication condition of the communication channel CH12. Next, the first communication apparatus 300 divides the data by the modified packet length, and transmits the data to the second communication apparatus 400 by packetizing each divided data (S216). The packet of each divided data (hereinafter, divided packet) is modulated by a predetermined modulation method, and transmitted as a modulated signal. Next, the data of the divided packet is received by the second communication apparatus 400 (S218). When receiving all the divide packets, the second communication apparatus 400 combines the divided packets to restore the original data.

By using such a method, even when the communication conditions of the communication channels CH12 and CH21 are different, the packet length in the transmission system can be dynamically modified in accordance with the transmission path condition. Further, even when channel characteristics of the communication channel CH12 change, data can be dividedly transmitted by an appropriate packet length, so that the communication time is shortened. As a result, the convenience of the user can be improved.

Regarding the packet length modification method according to this embodiment, the general process flow has been described. As described above, even when the channel characteristics of the communication channels CH12 and CH21 are different, the technique described for the above first embodiment can be easily used. Next, functional configurations of each communication apparatus for realizing the above method will be described.

2-2: Functional Configuration of Communication Apparatus

Hereinafter, functional configurations of the first communication apparatus 300 and the second communication apparatus 400 included in the communication system 20 which can realize the above method will be described in detail. The technical features of this embodiment are included in both of the first communication apparatus 300 and the second communication apparatus 400.

2-2-1: Functional Configuration of First Communication Apparatus 300

Figure 16:
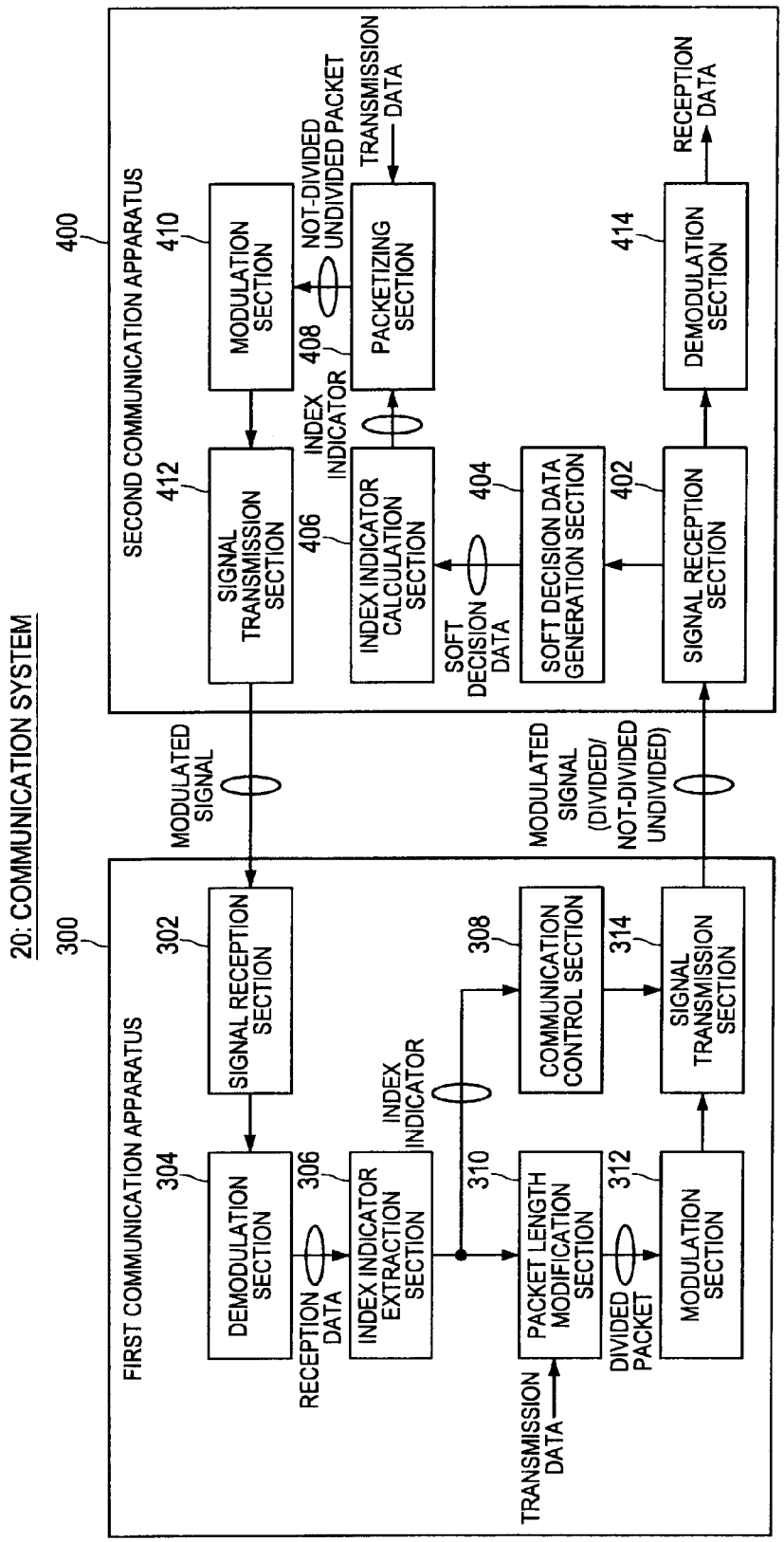
FIG. 16 shows a functional configuration example of a communication apparatus according to the second embodiment.

First, a functional configuration of the first communication apparatus 300 will be described with reference to FIG. 16. FIG. 16 shows a functional configuration example of the first communication apparatus 300 according to this embodiment.

As shown in FIG. 16, the first communication apparatus 300 mainly includes a signal reception section 302, a demodulation section 304, an indicator extraction section 306, a communication control section 308, a packet length modification section 310, a modulation section 312, and a signal transmission section 314. As described above, a characteristic function of the first communication apparatus 300 according to this embodiment is to transmit a signal to the second communication apparatus 400, receive an indicator calculated based on the signal from the second communication apparatus 400, and modify the packet length.

First, a packet of transmission data is input into the modulation section 312 via the packet length modification section 310. The packet input here may be a divided packet or an undivided packet. When the packet is input, in the modulation section 312, the packet is modulated based on a predetermined modulation method, and a modulated signal is generated. As the predetermined modulation method, for example, the phase shift keying method, the amplitude modulation method, and the like are used. The modulated signal generated by the modulation section 312 is input into the signal transmission section 314. When the modulated signal is input, the signal transmission section 314 transmits the modulated signal to the second communication apparatus 400.

As described above, in the second communication apparatus 400, the indicator is calculated based on the received modulated signal, and the indicator is transmitted to the first communication apparatus 300 in return. The first communication apparatus 300 receives the modulated signal including the indicator by the signal reception section 302. The modulated signal received by the signal reception section 302 is input into the demodulation section 304. In the demodulation section 304, the modulated signal is demodulated, and a data portion of the packet included in the modulated signal is output. The received data output from the demodulation section 304 is input into the indicator extraction section 306.

When the received data is input, the indicator extraction section 306 reads the indicator from the received data. The indicator read by the indicator extraction section 306 is input into the communication control section 308 and the packet length modification section 310. When the indicator is input, the communication control section 308 stops data transmission or re-starts the stopped data transmission in accordance with the value of the indicator. For example, when the indicator is greater than a predetermined value, the communication control section 308 determines that the communication environment deteriorates, and inputs a control signal for stopping the data transmission into the signal transmission section 314. On the other hand, when the indicator is smaller than a predetermined value, the communication control section 308 determines that the communication environment improves, and inputs a control signal for re-starting the data transmission into the signal transmission section 314.

The above predetermined values are indicator values for coping with a communication condition in which, even when modifying the packet length, data is difficult to transmit in a predetermined time period. By making such a configuration, it is possible to stop the data transmission when the communication environment deteriorates, and re-start the data transmission after a random or a predetermined time has passed, or after the communication environment has improved. When there are many communication devices nearby which use the same channel, data transmission timing may need to be appropriately adjusted. In such a situation, when each communication device calculates the above indicator, and controls transmission timing based on the indicator, the data transmission timing can be adjusted more efficiently.

When the indicator is input, the packet length modification section 310 modifies the packet length in accordance with the value of the indicator, and generates a divided packet by the modified packet length.

For example, the packet length modification section 310 includes a packet length selection section 332 and a packetizing section 334 as shown in part (A) of FIG. 17. The packet length selection section 332 is a means for selecting an appropriate packet length in accordance with the input indicator. The packet length selection section 332 refers to the input indicator and the indicator table (refer to FIG. 10) in which the indicators and predetermined packet lengths are associated with each other, and selects an appropriate packet length. The packet length information selected by the packet length selection section 332 is input into the packetizing section 334. When the packet length information is input, the packetizing section 334 divides transmission data by the packet length selected by the packet length selection section 332, and generates a divided packet by packetizing the divided transmission data.

For another example, the packet length modification section 310 includes a packet length calculation section 336 and the packetizing section 334 as shown in part (B) of FIG. 17. The packet length calculation section 336 is a means for calculating an appropriate packet length in accordance with the input indicator. For example, the packet length calculation section 336 holds information of the arithmetic formula represented by the above formula (8), and calculates a packet length adapted to the indicator by using the arithmetic formula. The packet length information calculated by the packet length calculation section 336 is input into the packetizing section 334. When the packet length information is input, the packetizing section 334 divides transmission data by the packet length calculated by the packet length calculation section 336, and generates a divided packet by packetizing the divided transmission data.

The divided packet generated by the packet length modification section 310 in that way is input into the modulation section 312. When the divided packet is input from the packet length modification section 310, the modulation section 312 modulates the divided packet based on a predetermined modulation method, and generates a modulated signal. The modulated signal generated by the modulation section 312 is input into the signal transmission section 314. When the modulated signal is input, the signal transmission section 314 transmits the input modulated signal to the second communication apparatus 400. The signal transmission section 314 stops the transmission of the modulated signal or re-starts the transmission in accordance with the control signal input from the communication control section 308. The signal transmission section 314 may be configured to transmit a test packet for checking the communication condition in the transmission path to the second communication apparatus 400 when the control signal to stop the transmission is input from the communication control section 308.

So far, the functional configuration of first communication apparatus 300 has been described.

2-2-2: Functional Configuration of Second Communication Apparatus 400

Next, a functional configuration of the second communication apparatus 400 will be described with reference to FIG. 16. FIG. 16 shows a functional configuration example of the second communication apparatus 400 according to this embodiment.

As shown in FIG. 16, the second communication apparatus 400 mainly includes a signal reception section 402, a soft decision data generation section 404, an indicator calculation section 406, a packetizing section 408, a modulation section 410, a signal transmission section 412, and a demodulation section 410.

As described above, when the modulated signal is transmitted from the first communication apparatus 300, the modulated signal is received by the signal reception section 402. The modulated signal received by the signal reception section 402 is input into the soft decision data generation section 404. When the modulated signal is input, the soft decision data generation section 404 generates soft decision data from the modulated signal. The soft decision data generation section 404 detects each bit value as a value having two or more bits (soft decision data value) by using, for example, analog-digital conversion or a soft decision data detection method (refer to FIGS. 27, 28, and 29) described below. For example, the soft decision data generation section 404 can detect a soft decision data string having amplitude values as shown in FIG. 4.

The soft decision data string generated by the soft decision data generation section 404 is input into the indicator calculation section 406. When the soft decision data string is input, the indicator calculation section 406 counts the number of data values (parameter ERNUM) included in the soft decision data string. The indicator calculation section 406 also calculates absolute values of each soft decision data. The indicator calculation section 406 sums up the absolute values of each soft decision data and calculates an absolute value sum (ERABS). Further, the indicator calculation section 406 calculates an average of the absolute values (absolute value average AVE) by using the parameter ERNUM and the absolute value sum ERABS. Also, the indicator calculation section 406 calculates square values of each soft decision data and calculates the sum of the square values (square value sum ERSQA).

The indicator calculation section 406 calculates a standard deviation (STDEV) of the soft decision data string by using the parameter ERNUM, the square value sum ERSQA, and the absolute value sum ERABS. The absolute value average AVE and the standard deviation STDEV are calculated based on the above formulas (1) and (2). When the absolute value average AVE and the standard deviation STDEV are calculated, the indicator calculation section 406 calculates the indicator (SDI) based on the above formula (3). The indicator SDI calculated by the indicator calculation section 406 is input into the packetizing section 408. Transmission data to be transmitted to the first communication apparatus 300 is also input into the packetizing section 408.

Figure 18:
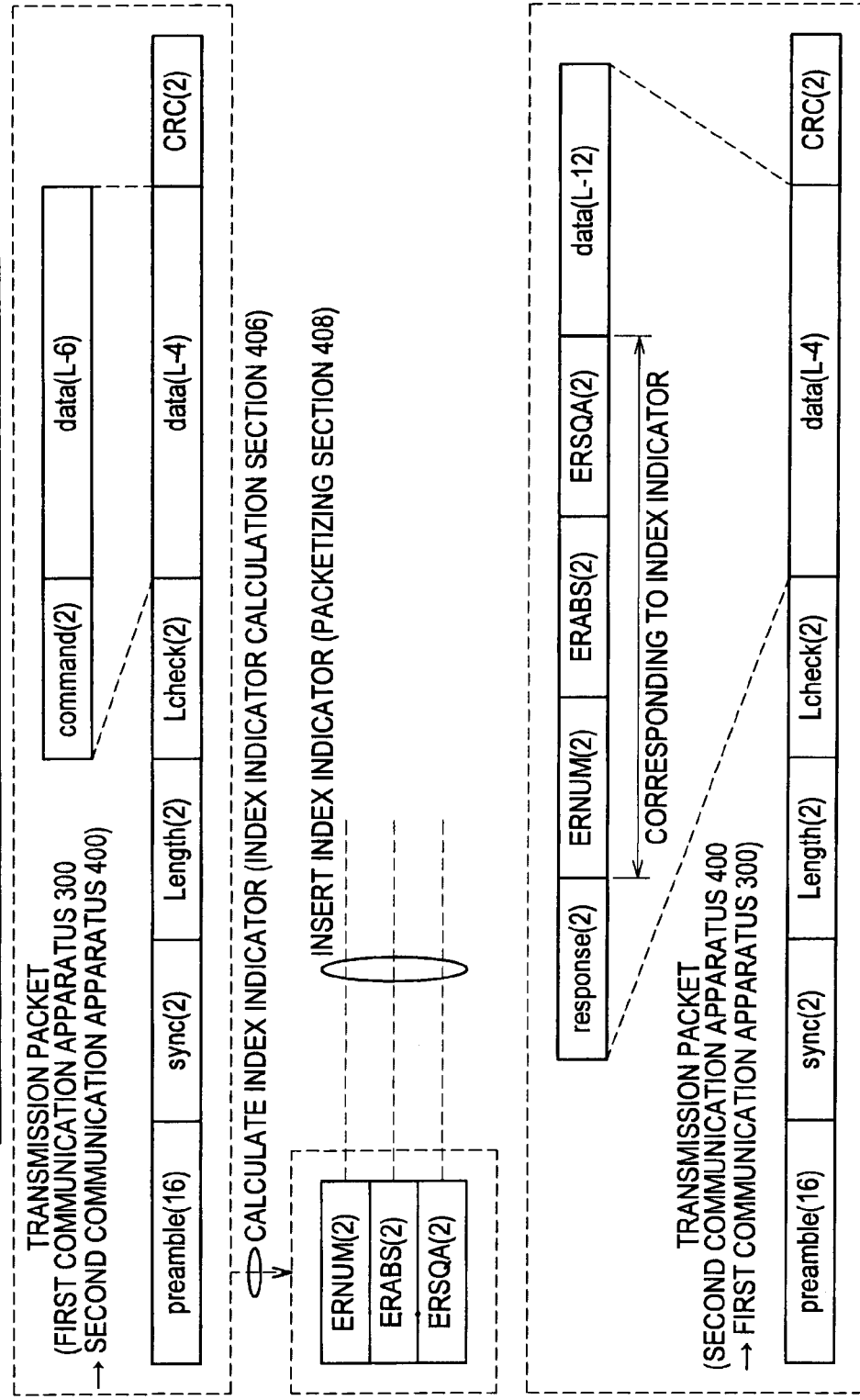
FIG. 18 shows a configuration example of a transmission packet according to the second embodiment.

When the indicator SDI is input, the packetizing section 408 packetizes the indicator SDI along with the transmission data and generates a transmission packet (refer to FIG. 18). Here, a configuration of the transmission packet generated by the packetizing section 408 will be briefly described with reference to FIG. 18. FIG. 18 is an illustration showing the packet configuration including the indicator SDI and an indicator transmission method. FIG. 18 shows a configuration of a transmission packet transmitted from the first communication apparatus 300 to the second communication apparatus 400 (hereinafter, transmission packet P12) and a configuration of a transmission packet transmitted from the second communication apparatus 400 to the first communication apparatus 300 (hereinafter, transmission packet P21).

First, a configuration of the transmission packet P12 will be described. The transmission packet P12 includes a preamble (preamble), a synchronous code (sync), a length (length), a length check (Lcheck), data (data), and an error check (CRC).

Further, the data (data) may include a command (command) as shown in the example of FIG. 18. In this command (command), for example, a control command for controlling the operation of the second communication apparatus 400. As described above, when receiving the transmission packet P12, the second communication apparatus 400 calculates the indicator SDI by the indicator calculation section 406. At this time, the indicator calculation section 406 calculates the indicator SDI by using the synchronous code sync and following data.

On the other hand, the transmission packet P21 includes a preamble (preamble), a synchronous code (sync), a length (length), a length check (Lcheck), data (data), and an error check (CRC). However, the data (data) in the transmission packet P21 includes a response (response), an indicator (indicator; ERNUM, ERABS, ERSQA), and data "data". In other words, in the transmission packet P21, the indicator (indicator) is inserted in the data (data) portion. This insertion processing is performed by the packetizing section 408. In the first communication apparatus 300, the indicator (indicator) included in the data (data) is extracted by the indicator extraction section 306. The response (response) described above represents response data to the command (command).

The transmission packet P21 in which the indicator SDI is inserted in that way is input from the packetizing section 408 into the modulation section 410. When the transmission packet P21 is input from the packetizing section 408, the modulation section 410 modulates the transmission packet P21 based on a predetermined modulation method, and generates a modulated signal. The modulated signal generated by the modulation section 410 is input into the signal transmission section 412. When the modulated signal is input, the signal transmission section 412 transmits the input modulated signal to the first communication apparatus 300. As described above, the first communication apparatus 300 extracts the indicator SDI from the received modulated signal, and determines an appropriate packet length based on the indicator SDI. Then, the first communication apparatus 300 divides data by the determined packet length, and transmits the divided packet to the second communication apparatus 400.

The second communication apparatus 400 receives the modulated signal including the divided packet by the signal reception section 402. The modulated signal, which corresponds to each divided packet, received by the signal reception section 402 is input into the demodulation section 414. When the modulated signal is input, the demodulation section 414 demodulates the modulated signal, and extracts divided data from each divided packet. When extracting all the divided data, the demodulation section 414 combines the divided data to restore the original data. The data restored by the demodulation section 414 in that way is output as reception data. The modulated signal received by the signal reception section 402 is also input into the soft decision data generation section 404, and used to calculate the indicator SDI. The processing such as transmitting the indicator SDI and modifying the packet length is repeatedly performed.

So far, the functional configuration of the second communication apparatus 400 has been described. By using such a method, even when the communication conditions of the communication channels CH12 and CH21 are different, the packet length in the transmission system can be dynamically modified in accordance with the transmission path condition. Further, even when channel characteristics of the communication channel CH12 change, data can be dividedly transmitted by an appropriate packet length, so that the communication time is shortened. As a result, the convenience of the user can be improved.

So far, the configurations of the communication system 20 according to the second embodiment of the present invention, the first communication apparatus 300, and the second communication apparatus 400 have been described in detail while comparing with the contents of the above first embodiment. By applying the above configurations, the communication condition of the transmission path can be appropriately evaluated, and the packet length can be dynamically modified in accordance with the evaluation result.

3: Third Embodiment

Next, the third embodiment of the present invention will be described. In the second embodiment described above, a method in which one communication channel CH12 is evaluated and the packet length is modified in accordance with the evaluation result is shown. This embodiment evaluates both of the communication channels CH12 and CH21, and improves the two-way communication environment by using the evaluation result. However, note that basic technical idea is derived from the second embodiment described above.

3-1: Functional Configuration of Communication Apparatus

First, functional configurations of a first communication apparatus 500 and a second communication apparatus 600 included in a communication system 30 according to this embodiment will be described in detail.

3-1-1: Functional Configuration of First Communication Apparatus 500

First, a functional configuration of the first communication apparatus 500 will be described with reference to FIG. 19. FIG. 19 shows a functional configuration example of the first communication apparatus 500 according to this embodiment.

Figure 19:
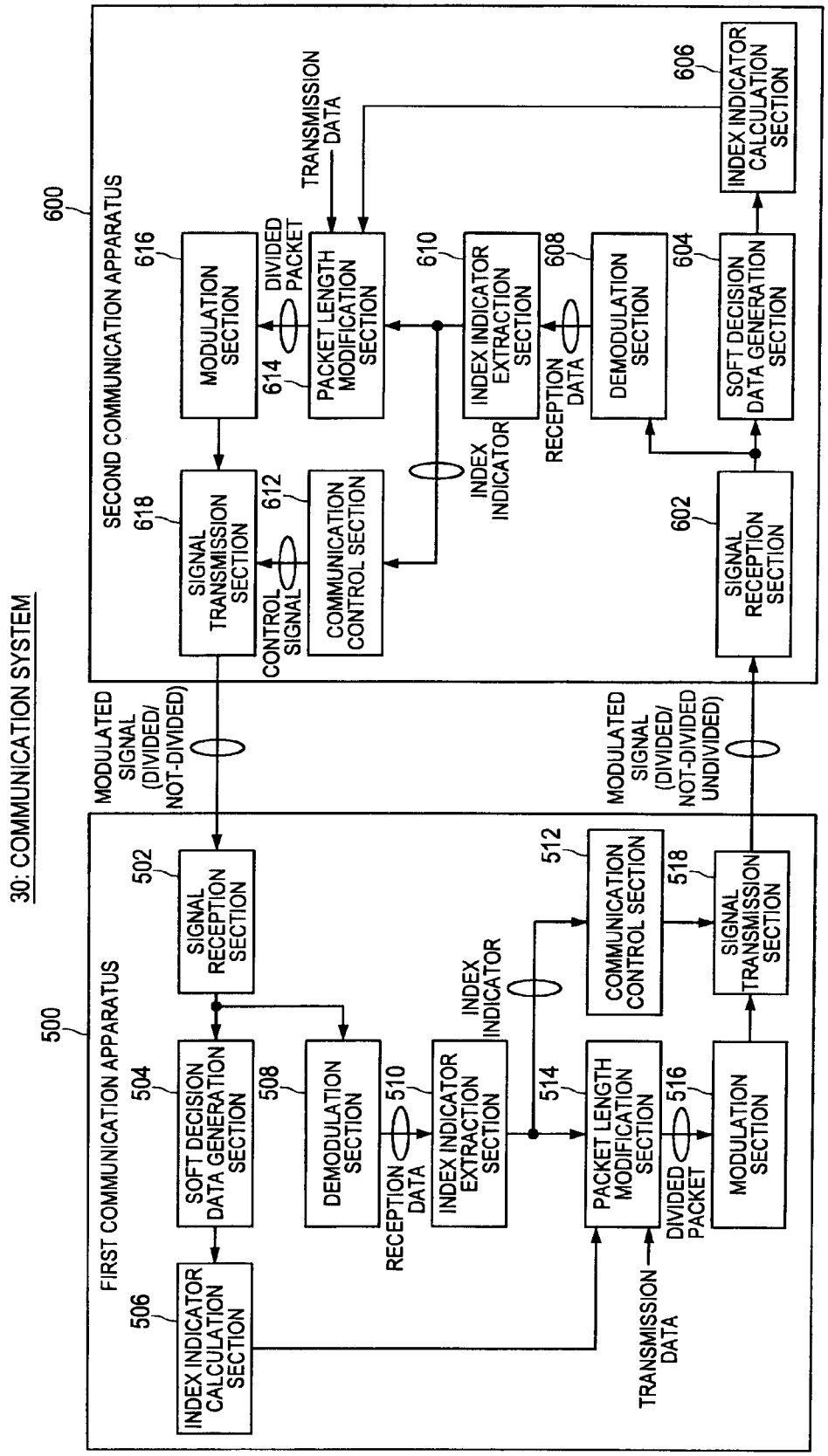
FIG. 19 shows a functional configuration example of a communication apparatus according to a third embodiment of the present invention.

As shown in FIG. 19, the first communication apparatus 500 mainly includes a signal reception section 502, a soft decision data generation section 504, an indicator calculation section 506, a demodulation section 508, and an indicator extraction section 510. Further, the first communication apparatus 500 includes a communication control section 512, a packet length modification section 514, a modulation section 516, and a signal transmission section 518.

First, a packet of transmission data is input into the modulation section 516 via the packet length modification section 514. The packet input here may be a divided packet or an undivided packet. When the packet is input, in the modulation section 516, the packet is modulated based on a predetermined modulation method, and a modulated signal is generated. As the predetermined modulation method, for example, the phase shift keying method, the amplitude modulation method, and the like are used. The modulated signal generated by the modulation section 516 is input into the signal transmission section 518. When the modulated signal is input, the signal transmission section 518 transmits the modulated signal to the second communication apparatus 600.

In the second communication apparatus 600, an indicator is calculated based on the received modulated signal, and the indicator is transmitted to the first communication apparatus 500 in return. The first communication apparatus 500 receives the modulated signal including the indicator by the signal reception section 502. The modulated signal received by the signal reception section 502 is input into the soft decision data generation section 504 and the demodulation section 508.

When the modulated signal is input, the soft decision data generation section 504 generates soft decision data from the modulated signal. The soft decision data generation section 504 detects each bit value as a value having two or more bits (soft decision data value) by using, for example, analog-digital conversion or a soft decision data detection method (refer to FIGS. 27, 28, and 29) described below. For example, the soft decision data generation section 504 can detect a soft decision data string having amplitude values as shown in FIG. 4.

The soft decision data string generated by the soft decision data generation section 504 is input into the indicator calculation section 506. When the soft decision data string is input, the indicator calculation section 506 counts the number of data values (parameter ERNUM) included in the soft decision data string. The indicator calculation section 506 also calculates absolute values of each soft decision data. The indicator calculation section 506 sums up the absolute values of each soft decision data and calculates an absolute value sum (ERABS). Further, the indicator calculation section 506 calculates an average of the absolute values (absolute value average AVE) by using the parameter ERNUM and the absolute value sum ERABS. Also, the indicator calculation section 506 calculates square values of each soft decision data and calculates the sum of the square values (square value sum ERSQA).

The indicator calculation section 506 calculates a standard deviation (STDEV) of the soft decision data string by using the parameter ERNUM, the square value sum ERSQA, and the absolute value sum ERABS. The absolute value average AVE and the standard deviation STDEV are calculated based on the above formulas (1) and (2). When the absolute value average AVE and the standard deviation STDEV are calculated, the indicator calculation section 506 calculates the indicator (SDI) based on the above formula (3). The indicator SDI calculated by the indicator calculation section 506 is input into the packet length modification section 514.

On the other hand, in the demodulation section 508, the modulated signal is demodulated, and a data portion of the packet included in the modulated signal is output. The received data output from the demodulation section 508 is input into the indicator extraction section 510. When the received data is input, the indicator extraction section 510 reads the indicator from the received data. The indicator read by the indicator extraction section 510 is input into the communication control section 512 and the packet length modification section 514.

When the indicator is input, the communication control section 512 stops data transmission or re-starts the stopped data transmission in accordance with the value of the indicator. For example, when the indicator is greater than a predetermined value, the communication control section 512 determines that the communication environment deteriorates, and inputs a control signal for stopping the data transmission into the signal transmission section 518. On the other hand, when the indicator is smaller than a predetermined value, the communication control section 512 determines that the communication environment improves, and inputs a control signal for re-starting the data transmission into the signal transmission section 518.

The above predetermined values are indicator values for coping with a communication condition in which, even when modifying the packet length, data is difficult to transmit in a predetermined time period. By making such a configuration, it is possible to stop the data transmission when the communication environment deteriorates, and re-start the data transmission after a random or a predetermined time has passed, or after the communication environment has improved. When there are many communication devices nearby which use the same channel, data transmission timing may need to be appropriately adjusted. In such a situation, when each communication device calculates the above indicator, and controls transmission timing based on the indicator, the data transmission timing can be adjusted more efficiently.

When the indicator from the indicator extraction section 510 is input, the packet length modification section 514 modifies the packet length in accordance with the value of the indicator, and generates a divided packet by the modified packet length. However, the packet length modification section 514 inserts the indicator SDI calculated by the indicator calculation section 506 into the data (data) portion of the divided packet as shown in part (B) of FIG. 18. The divided packet generated by the packet length modification section 514 in that way is input into the modulation section 516.

When the divided packet is input from the packet length modification section 514, the modulation section 516 modulates the divided packet based on a predetermined modulation method, and generates a modulated signal. The modulated signal generated by the modulation section 516 is input into the signal transmission section 518. When the modulated signal is input, the signal transmission section 518 transmits the input modulated signal to the second communication apparatus 600. The signal transmission section 518 stops the transmission of the modulated signal or re-starts the transmission in accordance with the control signal input from the communication control section 512. The signal transmission section 518 may be configured to transmit a test packet for checking the communication condition in the transmission path to the second communication apparatus 600 when the control signal to stop the transmission is input from the communication control section 512.

So far, the functional configuration of the first communication apparatus 500 has been described.

3-1-2: Functional Configuration of Second Communication Apparatus 600

Next, a functional configuration of the second communication apparatus 600 will be described with reference to FIG. 19. FIG. 19 shows a functional configuration example of the second communication apparatus 600 according to this embodiment. However, the configuration of the second communication apparatus 600 is substantially the same as that of the first communication apparatus 500. Therefore, detailed explanation of constituent elements is omitted, and only correspondence relationships between each constituent element will be described.

As shown in FIG. 19, the second communication apparatus 600 mainly includes a signal reception section 602, a soft decision data generation section 604, an indicator calculation section 606, a demodulation section 608, and an indicator extraction section 610. The signal reception section 502, the soft decision data generation section 504, the indicator calculation section 506, the demodulation section 508, and the indicator extraction section 510 included in the first communication apparatus 500 correspond to the above constituent elements respectively. Further, the second communication apparatus 600 includes a communication control section 612, a packet length modification section 614, a modulation section 616, and a signal transmission section 618. The communication control section 512, the packet length modification section 514, the modulation section 516, and the signal transmission section 518 included in the first communication apparatus 500 correspond to the above constituent elements respectively. The flow of data and signal transmitted between each constituent element is the same as that of the first communication apparatus 500.

So far, the functional configuration of the second communication apparatus 600 has been described.

By applying such a configuration, even when the communication conditions of the communication channels CH12 and CH21 are different, the packet length in the transmission system can be dynamically modified in accordance with the transmission path condition. Further, even when channel characteristics of the communication channels CH12 and CH 21 change, data can be dividedly transmitted in two-way by an appropriate packet length, so that the communication time is shortened. As a result, the convenience of the user can be improved.

3-2: Hardware Configuration of Each Communication Apparatus

Next, a hardware configuration of the first communication apparatus 500 and the second communication apparatus 600 will be described with reference to FIGS. 20 to 23. Since the first communication apparatus 500 and the second communication apparatus 600 have substantially the same configuration, the description of the second communication apparatus 600 is omitted.

Figure 20:
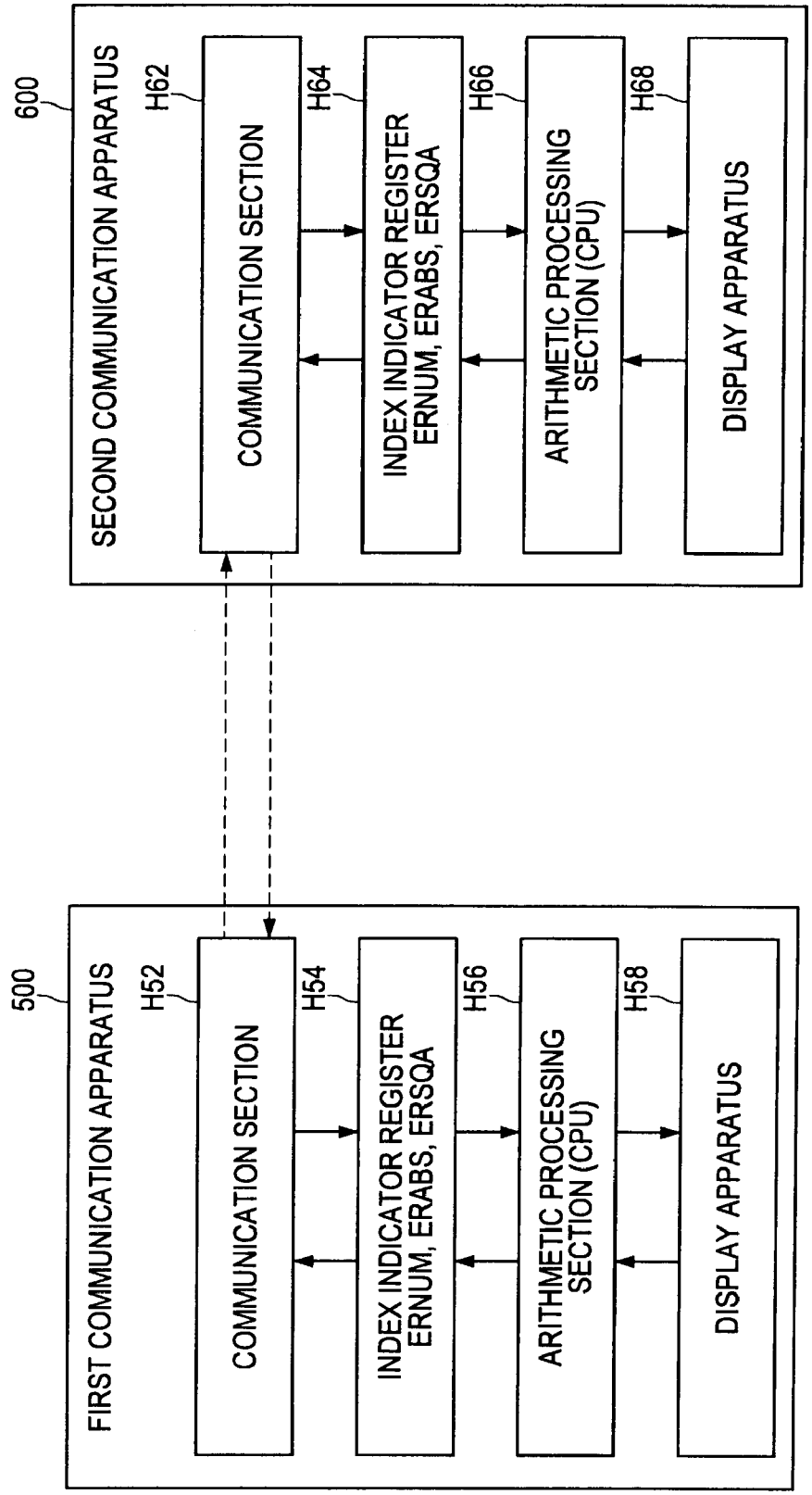
FIG. 20 shows a hardware configuration example of the communication apparatus according to the third embodiment.

First, refer to FIG. 20. As shown in FIG. 20, the function of the first communication apparatus 500 is realized by including a communication section H52, an indicator register H54, an arithmetic processing section H56 (CPU), and a display apparatus H58. The indicator register H54 is shared between the communication section H52 and the arithmetic processing section H56. A keyboard and various switches are additionally provided to the first communication apparatus 500. Further, the display apparatus H58 on which the indicator is displayed may be omitted. The second communication apparatus 600 has a similar configuration to that described above.

(Register Configuration: Communication Section H52 and Indicator Register H54)

Figure 21:
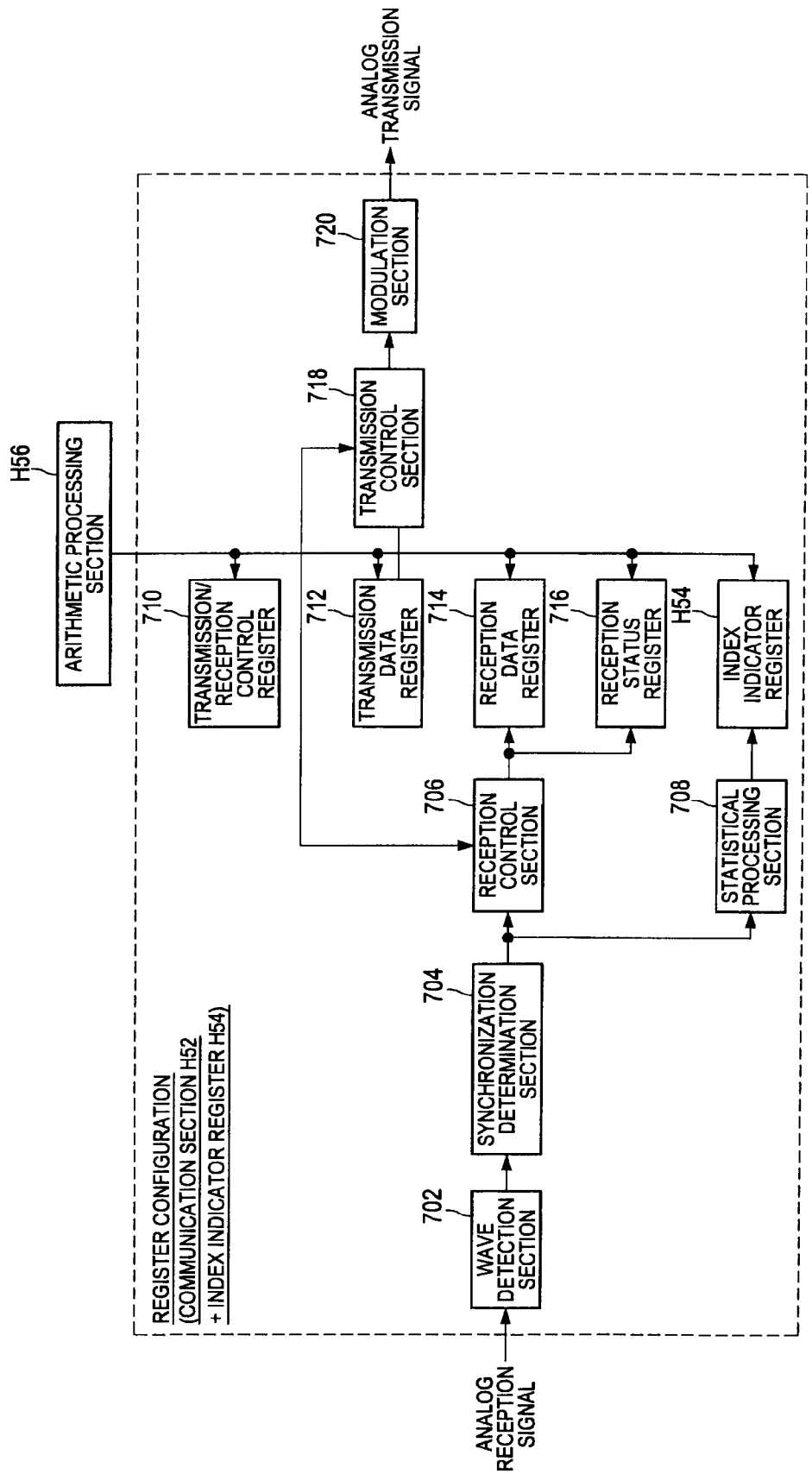
FIG. 21 shows a register configuration of the communication apparatus according to the third embodiment.

Next, refer to FIG. 21. FIG. 21 shows a register group included in the communication section H52, and indicator register H54. First, when information indicating a start of reception processing is input in a transmission/reception control register 710, a reception control section 706 starts the reception processing. When the reception processing is started and an analog reception signal is input into a wave detection section 702, the result detected by the wave detection section 702 is input into a synchronization determination section 704. In the synchronization determination section 704, data is detected by using an analog-digital converter or the like, and a soft decision data string is generated as detected data.

Hard decision data is generated from the soft decision data generated in the synchronization determination section 704, and input into the reception control section 706. The reception control section 706 stores the input hard decision data into a reception data register 714. The reception control section 706 stores information (OK or NG) indicating the reception condition into the reception data register 714 in accordance with the reception condition. The reception control section 706 stores information indicating the end of the reception processing into the transmission/reception control register 710. When the information indicating the end of the reception processing is stored in the transmission/reception control register 710, the arithmetic processing section 1156 refers to the information and recognizes the end of the reception processing.

On the other hand, the soft decision data output from the synchronization determination section 704 is input into a statistical processing section 708. As described below, the statistical processing section 708 calculates the parameter ERNUM, the absolute value sum ERABS, and the square value sum ERSQA from the soft decision data. The parameter ERNUM, the absolute value sum ERABS, and the square value sum ERSQA calculated by the statistical processing section 708 are stored in the indicator register 1154. The parameter ERNUM, the absolute value sum ERABS, and the square value sum ERSQA stored in the indicator register H54 are read by the arithmetic processing section 1156, and used to calculate the indicator SDI.

When information indicating a start of transmission processing is input in the transmission/reception control register 710, a transmission control section 718 starts the transmission processing. The transmission control section 718 reads the transmission data stored in a transmission data register 712, and inputs the transmission data into a modulation section 720. The transmission data series input into the modulation section 720 is modulated by a predetermined modulation method, and transmitted as an analog transmission signal. When the transmission processing ends, the transmission control section 718 stores information indicating the end of the transmission processing into the transmission/reception control register 710. The arithmetic processing section H56 refers to the information stored in the transmission/reception control register 710, and recognizes the end of the transmission processing.

The transmission/reception processing is realized by the register configuration as described above.

(Details of Statistical Processing Section 708)

Figure 22:
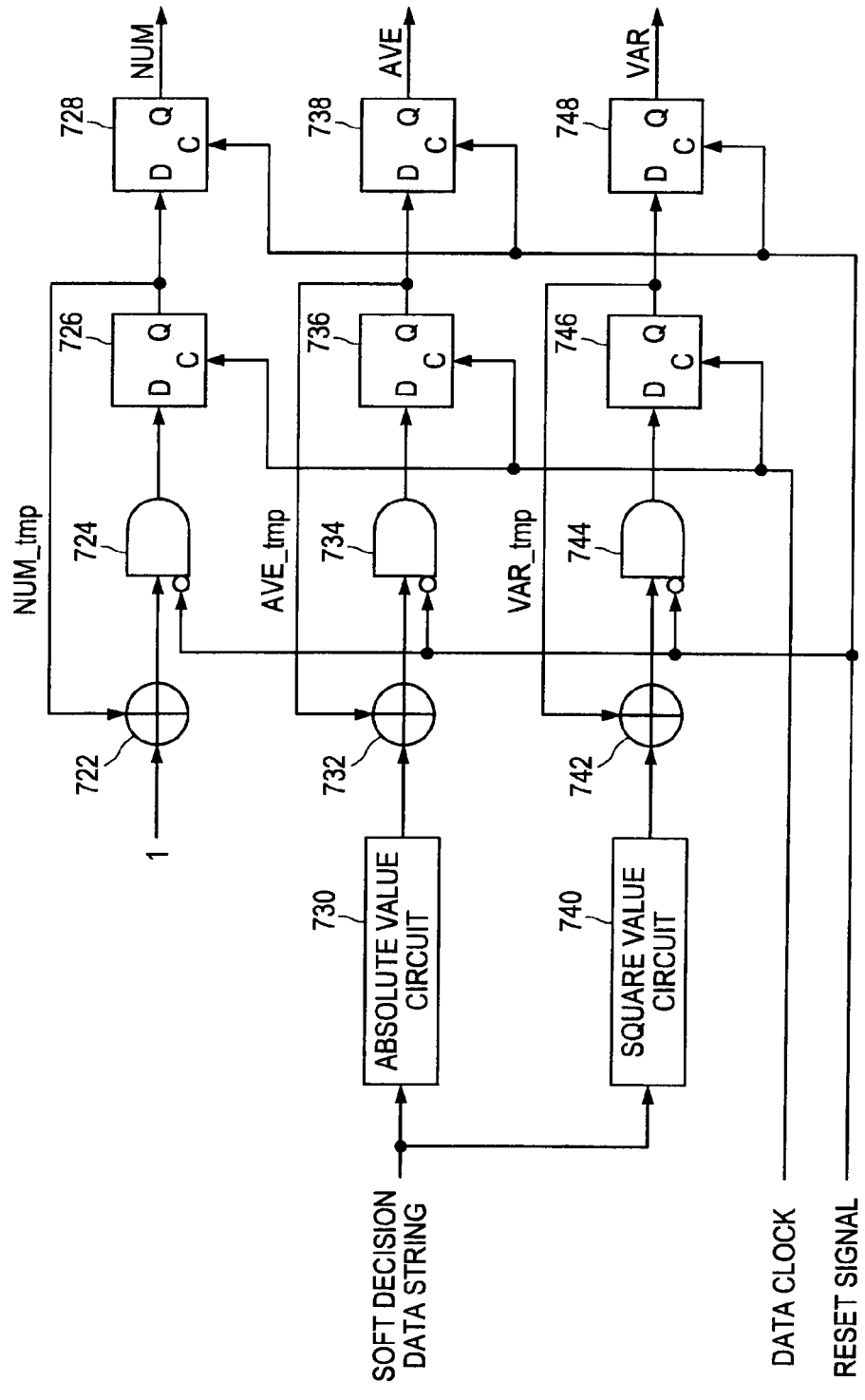
FIG. 22 shows a circuit configuration example of a statistical processing section according to the third embodiment.

Next, refer to FIG. 22. In FIG. 22, a circuit configuration of the statistical processing section 708 is described. The statistical processing section 708 is constituted by a block for obtaining a parameter NUM, a block for obtaining an absolute value sum AVE, and a block for obtaining a square value sum VAR.

(Block for Obtaining Parameter NUM)

The block for obtaining the parameter NUM includes an adder 722, an AND circuit 724, and D flip-flops 726, 728. This block functions as a counter.

First, a bit value "1" is input into the adder 722 every time the soft decision data is input. The adder 722 adds the input bit value "1" and a temporary parameter NUM-tmp input from the D flip-flop 726. The new temporary parameter NUM-tmp output from the adder 722 is input into the AND circuit 724.

A reset signal is input into the AND circuit 724. When the reset signal is not input into the AND circuit 724, the AND circuit 724 inputs a value indicating the temporary parameter NUM-temp input from the adder 722 into the D flip-flop 726. When the reset signal is input into the AND circuit 724, the AND circuit 724 inverts the reset signal, obtains the inverted reset signal, and inputs a bit value "0" into the D flip-flop 726 as the temporary parameter NUM-temp. In other words, the AND circuit 724 resets the temporary parameter NUM-tmp to 0 at the timing when the reset signal is input.

The D flip-flop 726 obtains the value indicating the temporary parameter NUM-temp from the AND circuit 724 at a timing when an input data clock DClk rises. The D flip-flop 726 holds the obtained value until the next data clock DClk rises. The D flip-flop 726 inputs the temporary parameter NUM-temp, which the D flip-flop 726 holds, into the adder 722 and the D flip-flop 728 at the timing when the data clock DClk rises. In other words, the D flip-flop 726 updates the temporary parameter NUM-temp, which D flip-flop 726 holds, at the timing when the data clock DClk rises.

The reset signal is input into the D flip-flop 728 in the same way as into the AND circuit 724. When the reset signal is input into the D flip-flop 728, the D flip-flop 728 obtains the temporary parameter NUM-temp from the D flip-flop 726, and outputs the obtained value as the final parameter NUM.

(Block for Obtaining Absolute Value Sum Ave)

The block for obtaining the absolute value sum AVE includes an absolute value circuit 730, an adder 732, an AND circuit 734, and D flip-flops 736, 738.

The absolute value circuit 730 calculates an absolute value of the input soft decision data. The calculation result output from the absolute value circuit 730 is input into the adder 732. The adder 732 adds the absolute value of the soft decision data input from the absolute value circuit 730 and a temporary absolute value sum AVE-tmp input from the D flip-flop 736. The new temporary absolute value sum AVE-tmp output from the adder 732 is input into the AND circuit 734.

The reset signal is input into the AND circuit 734. When the reset signal is not input into the AND circuit 734, the AND circuit 732 inputs the temporary absolute value sum AVE-tmp input from the adder 732 into the D flip-flop 736. When the reset signal is input into the AND circuit 734, the AND circuit 734 inverts the reset signal, obtains the inverted reset signal, and inputs a bit value "0" into the D flip-flop 736 as the temporary absolute value sum AVE-tmp. In other words, the AND circuit 734 resets the temporary absolute value sum AVE-tmp to 0 at the timing when the reset signal is input.

The D flip-flop 736 obtains the temporary absolute value sum AVE-tmp from the AND circuit 734 at the timing when the input data clock DClk rises. The D flip-flop 736 holds the obtained value until the next data clock DClk rises. The D flip-flop 736 inputs the temporary absolute value sum AVE-tmp, which the D flip-flop 736 holds, into the adder 732 and the D flip-flop 738 at the timing when the data clock DClk rises. In other words, the D flip-flop 736 updates the temporary absolute value sum AVE-tmp, which the D flip-flop 736 holds, at the timing when the data clock DClk rises.

The reset signal is input into the D flip-flop 738 in the same way as into the AND circuit 734. When the reset signal is input into the D flip-flop 738, the D flip-flop 738 obtains a value indicating the temporary absolute value sum AVE-tmp from the D flip-flop 736, and outputs the obtained value as a value indicating the final absolute value sum AVE.

(Block for Obtaining Square Value Sum VAR)

The block for obtaining the square value sum VAR includes a square value circuit 740, an adder 742, an AND circuit 744, and D flip-flops 746, 748.

The square value circuit 740 squares the value of the soft decision data input from the adder 223 and outputs the square value. The square value output from the square value circuit 740 is input into the adder 742. The adder 742 adds the square value of the soft decision data input from the square value circuit 740 and a temporary square value sum VAR-tmp input from the D flip-flop 746. The new temporary square value sum VAR-tmp output from the adder 742 is input into the AND circuit 744.

The reset signal is input into the AND circuit 744. When the reset signal is not input into the AND circuit 744, the AND circuit 744 inputs the temporary square value sum VAR-tmp input from the adder 742 into the D flip-flop 746. When the reset signal is input into the AND circuit 744, the AND circuit inverts the reset signal, obtains the inverted reset signal, and inputs a bit value "0" into the D flip-flop 746 as the temporary square value sum VAR-tmp. In other words, the AND circuit 744 resets the temporary square value sum VAR-tmp to 0 at the timing when the reset signal is input.

The D flip-flop 746 obtains the temporary square value sum VAR-tmp from the AND circuit 744 at the timing when the input data clock DClk rises. The D flip-flop 746 holds the obtained value until the next data clock DClk rises. The D flip-flop 746 inputs the temporary square value sum VAR-tmp, which the D flip-flop 746 holds, into the adder 742 and the D flip-flop 748 at the timing when the data clock DClk rises. In other words, the D flip-flop 746 updates the temporary square value sum VAR-tmp, which the D flip-flop 746 holds, at the timing when the data clock DClk rises.

The reset signal is input into the D flip-flop 748 in the same way as into the AND circuit 748. When the reset signal is input into the D flip-flop 748, the D flip-flop 748 obtains a value indicating the temporary square value sum VAR-tmp from the D flip-flop 746, and outputs the obtained value as the final square value sum VAR. The timing when the reset signal is input into the AND circuits 724, 734, and 744 is when the temporary parameter NUM-temp reaches a predetermined number. This timing may be when the detection of the soft decision data ends.

For example, in the case when the reset signal is input at the timing when the detection of the soft decision data ends, when the detection of the soft decision data starts at the same time as when the reception of the reception signal starts, the level of the reset signal is set to Low (value "0"). On the other hand, when the detection of the soft decision data ends at the same time as when the reception of the reception signal ends, the level of the reset signal is set to High (value "1"). The D flip-flop 728 outputs the parameter NUM at the timing when the reset signal goes High. The parameter NUM, the absolute value sum AVE, and the square value sum VAR may be configured to be updated every time the soft decision data obtained from the reception signal of one packet is processed instead of using the temporary parameter NUM-temp.

As described above, in the statistical processing section 708, every time the reset signal is input, the parameter NUM (ERNUM described above), the absolute value sum AVE (ERABS described above), and the square value sum VAR (ERSQA described above) are updated. The updated values are stored in the indicator register H54.

(Details of Arithmetic Processing Section H56)

Figure 23:
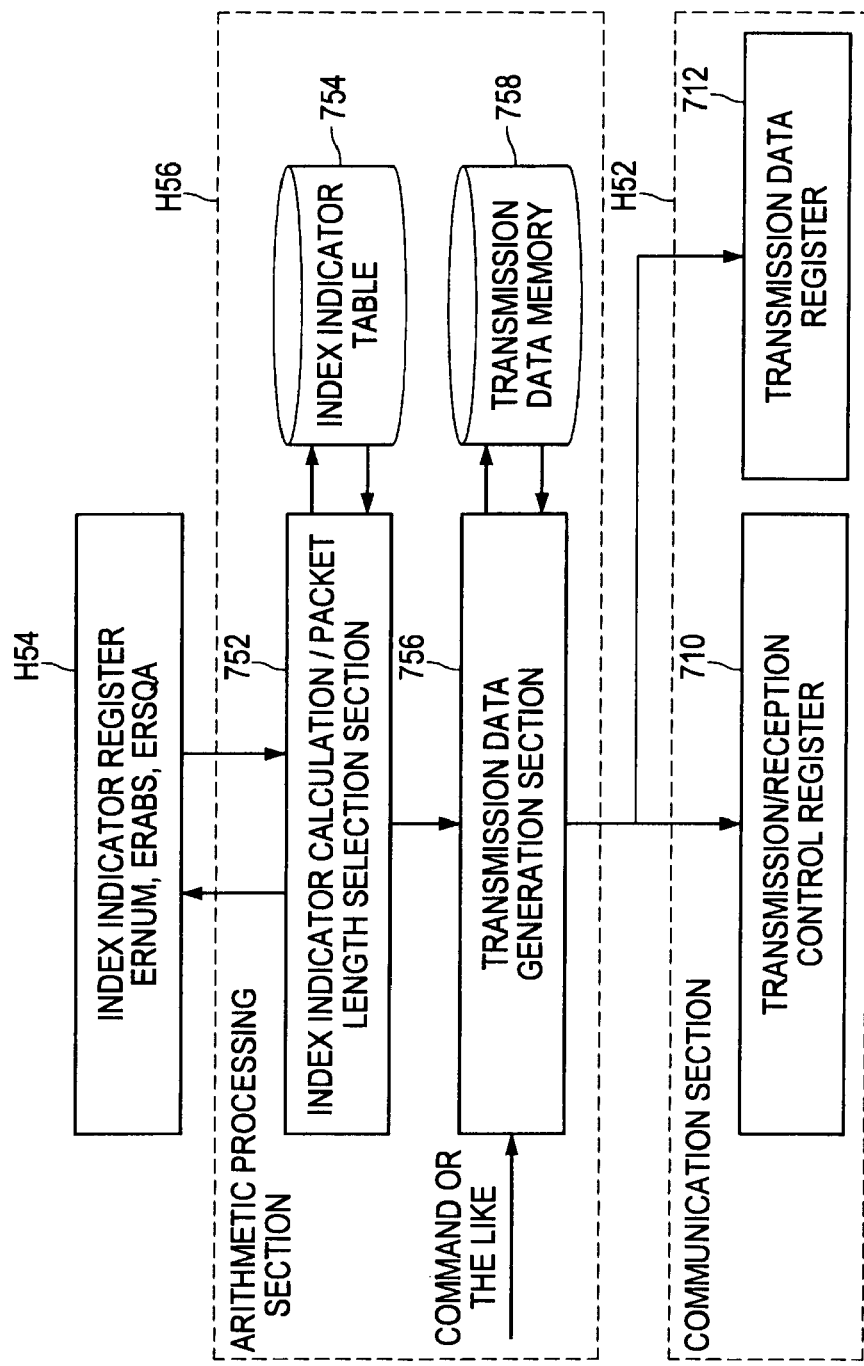
FIG. 23 shows a configuration example of an arithmetic processing section according to the third embodiment.

Next, refer to FIG. 23. In FIG. 23, a configuration example of the arithmetic processing section H56 is described. As shown in FIG. 23, the arithmetic processing section H56 includes an indicator calculation/packet length selection section 752, an indicator table 754, a transmission data generation section 756, and a transmission data memory 758.

When receiving an interrupt signal indicating the end of reception from the communication section H52, the arithmetic processing section H56 reads the received data and a flag indicating the reception condition stored in the register group in the communication section H52. At this time, the arithmetic processing section H56 also reads sequentially the parameter (ERNUM), the absolute value sum (ERABS), and the square value sum (ERSQA) stored in the indicator register H54. The parameter (ERNUM), the absolute value sum (ERABS), and the square value sum (ERSQA) read from the indicator register H54 are input into the indicator calculation/packet length selection section 752.

The indicator calculation/packet length selection section 752 calculates the indicator SDI by using the input parameter ERNUM, absolute value sum ERABS, and square value sum ERSQA. Further, the indicator calculation/packet length selection section 752 refers to the indicator table 754 (refer to FIG. 10), and selects an packet length corresponding to the calculated indicator SDI. In other words, the indicator calculation/packet length selection section 752 corresponds to the above described indicator calculation section 506 and packet length modification section 514. The packet length selected by the indicator calculation/packet length selection section 752 is transmitted to the transmission data generation section 756.

The transmission data generation section 756 reads the transmission data stored in the transmission data memory 758, divides the transmission data so that the length of the transmission data suits the transmitted packet length, and generates a divided packet. Then, the transmission data generation section 756 stores the divided packet into the transmission data register 712 and stores a flag indicating the start of transmission into the transmission/reception control register 710. In other words, the transmission data generation section 756 corresponds to a part of the function of the packet length modification section 514.

So far, the hardware configuration of the first communication apparatus 500 has been described. The functional configuration of the first communication apparatus 500 as shown in FIG. 19 is realized by the configuration described above. Of course, the second communication apparatus 600 has a similar configuration to that described above. Therefore, it is possible to appropriately control the packet length according to the communication environment, and shorten the total communication time, so that the convenience of the user improves significantly.

3-3: (Modified Example)

Hardware Configuration of Each Communication Apparatus

Next, a modified example of the above hardware configuration will be briefly described with reference to FIG. 24. A configuration in which a controller 540 is separately provided and a part of the function such as the display apparatus H58 is mounted on the controller 540 is considered, such as the first communication apparatus 530 shown in FIG. 24. For example, a contactless IC card reader/writer (so-called reader/writer) substantially has the same configuration as that of the first communication apparatus 530. In this case, the first communication apparatus 530 reciprocally transmits information via the arithmetic processing sections H56A and H56B. On the other hand, the second communication apparatus 630 corresponds to a contactless IC card, a mobile phone including a contactless IC chip, and the like. The technique according to this embodiment can be applied to such a configuration.

3-4: Flow of Data Read/Write Processing

Figure 24:
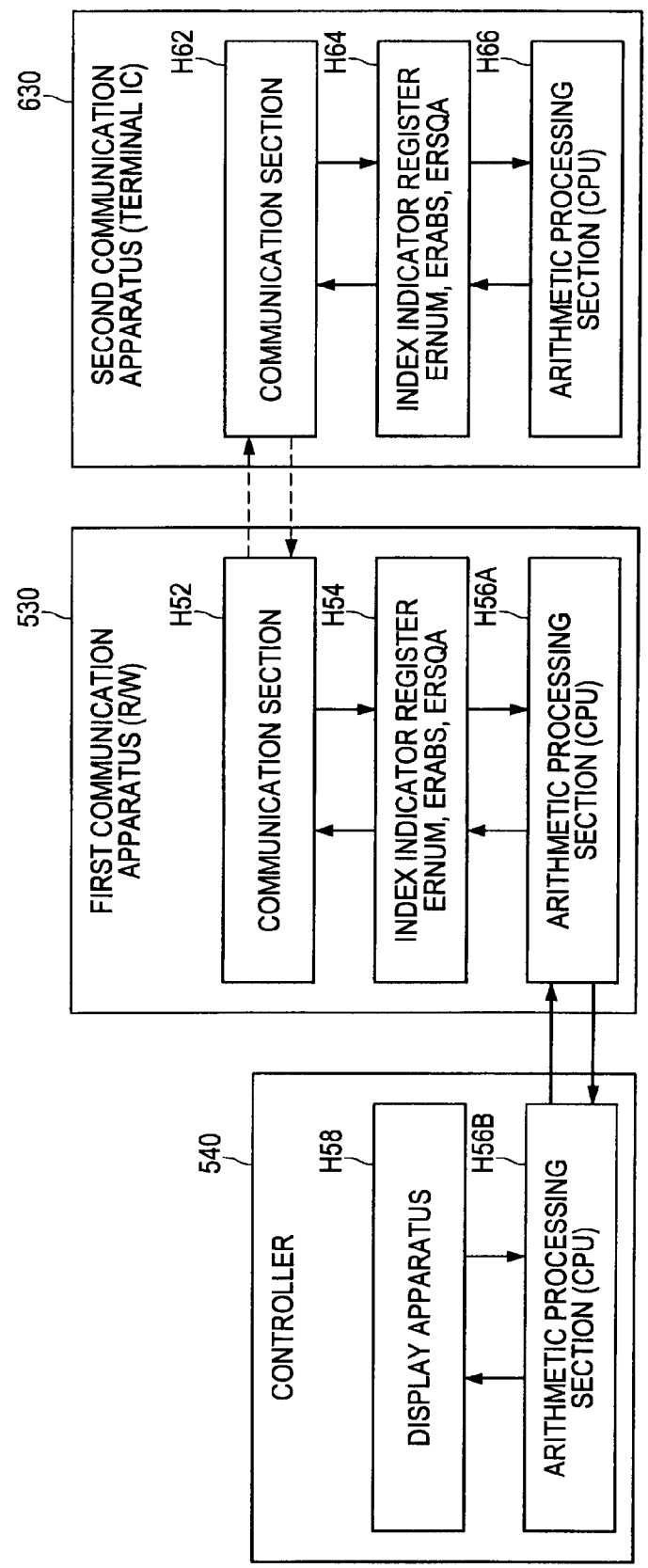
FIG. 24 shows a hardware configuration example of a communication apparatus according to a modified example of the third embodiment.
Figure 25:
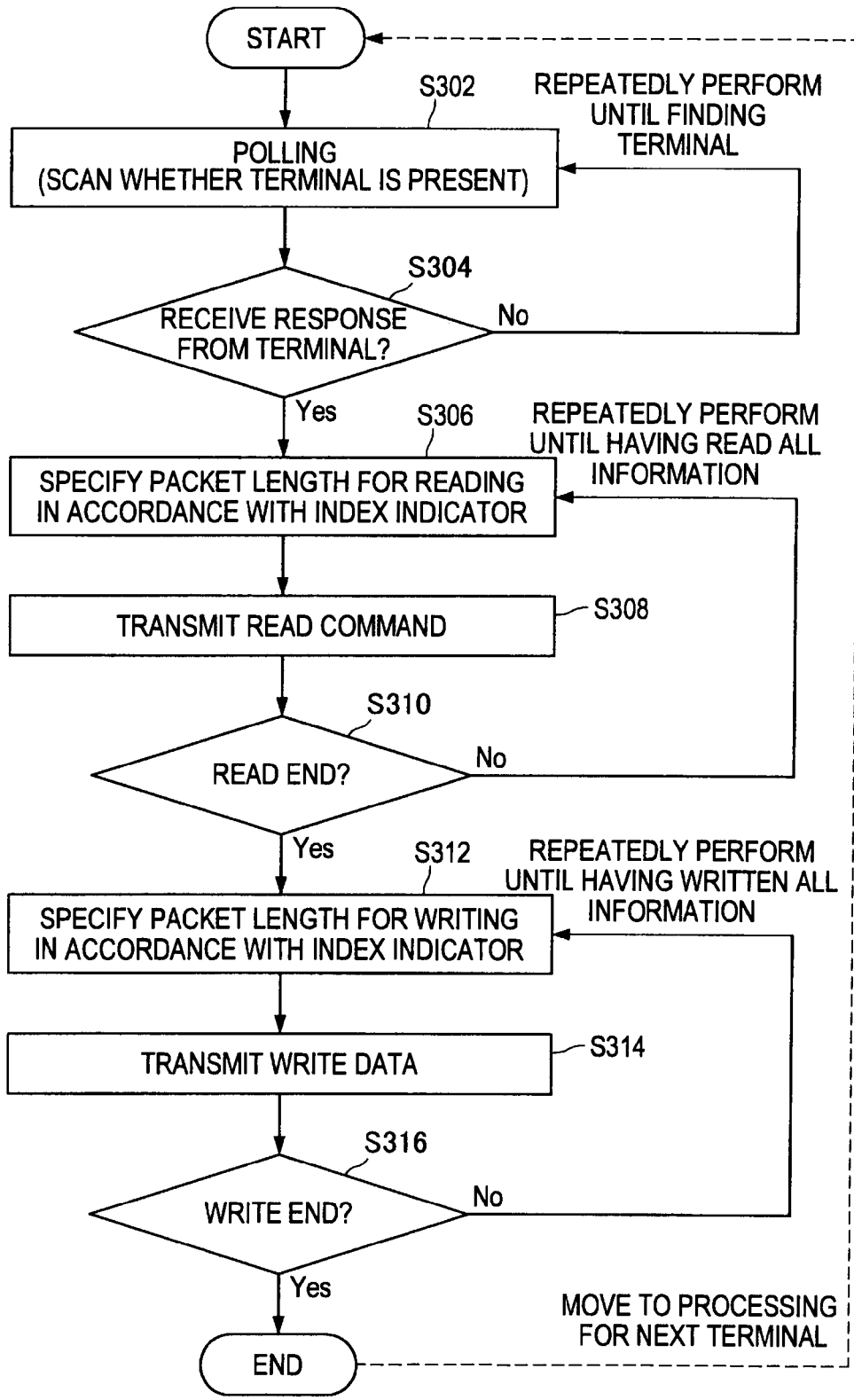
FIG. 25 shows a process flow of the communication apparatus according to the modified example of the third embodiment.

If the communication system 30 is constituted by a hardware configuration as shown in FIG. 24, the data read/write processing including dynamic modification processing of the packet length will be as shown in FIG. 25. Hereinafter, the data read/write processing will be briefly described. FIG. 25 is an illustration showing a flow of the data read/write processing according to this embodiment.

As shown in FIG. 25, a polling command is transmitted from the first communication apparatus 530 (S302). The polling command is transmitted to check whether or not the reception terminal (the second communication apparatus 630) is present. For example, when a response to the polling command is received, the first communication apparatus 530 recognizes that the reception terminal is present. Therefore, the first communication apparatus 530 determines whether or not a response to the transmitted polling command is received from the reception terminal (S304). When receiving the response, the first communication apparatus 530 proceeds to the processing of step S306. When not receiving the response, the first communication apparatus 530 proceeds to the processing of step S302 again and transmits a polling command again.

In step S306, the first communication apparatus 530 calculates the indicator in accordance with the response received from the reception terminal, and specifies a packet length corresponding to the indicator as the packet length used to read data (S306). Next, the first communication apparatus 530 transmits a read command by specifying the packet length specified in step S306 to the reception terminal (S308). Next, the first communication apparatus 530 determines whether or not to end the read processing (S310). When ending the read processing, the first communication apparatus 530 proceeds to the processing of step S312. When continuing the read processing, the first communication apparatus 530 proceeds to the processing of step S306 again.

When proceeding to the processing of step S312, the first communication apparatus 530 specifies a packet length used to write data in accordance with information of the indicator received from the reception terminal (S310). Next, the first communication apparatus 530 transmits write data by the specified packet length (S314). Next, the first communication apparatus 530 determines whether or not to end the write processing (S316). When continuing the write processing, the first communication apparatus 530 proceeds to the processing of step S312 again. When ending the write processing, the first communication apparatus 530 ends the series of the processing. Then, the first communication apparatus 530 proceeds to processing for the next reception terminal.

So far, the data read/write processing according to this embodiment has been described.

Figure 26:
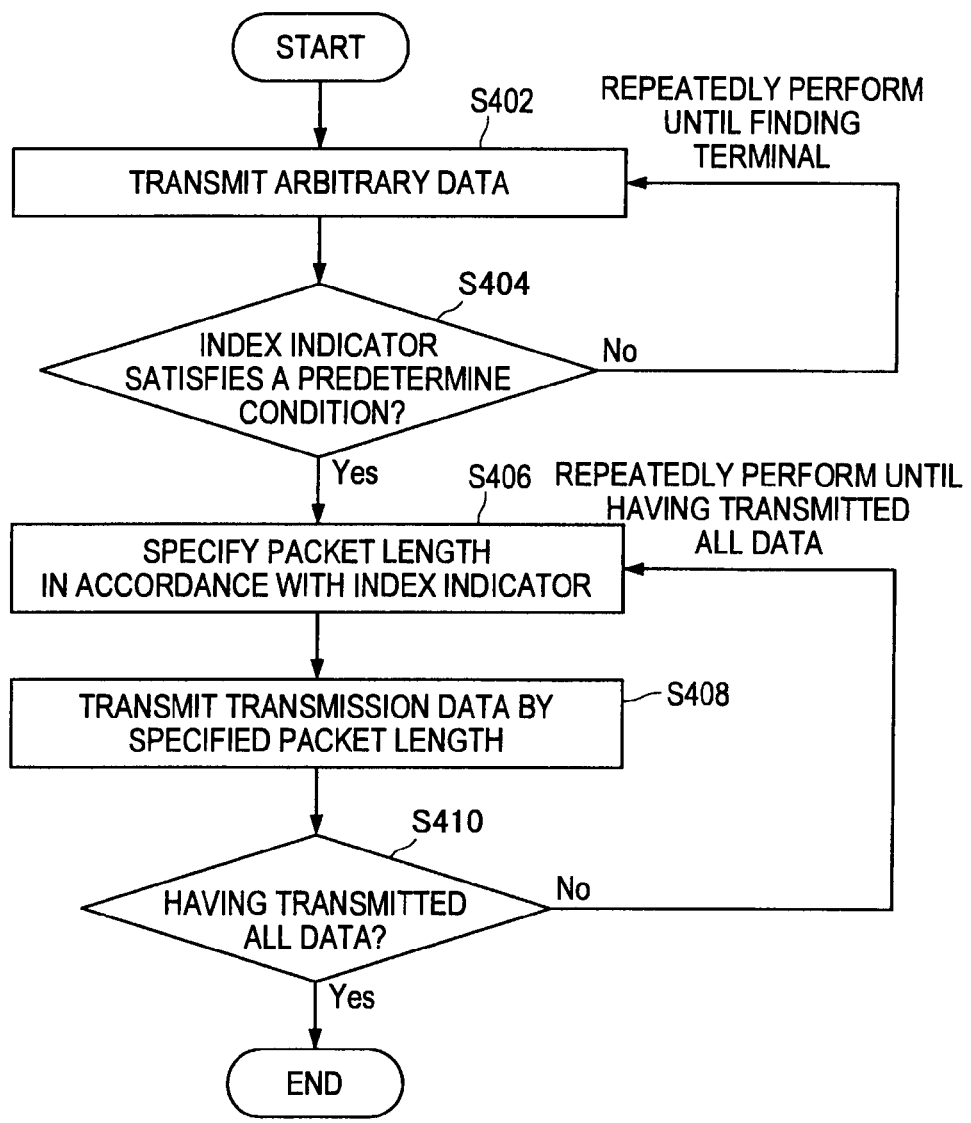
FIG. 26 shows a process flow of the communication apparatus according to the modified example of the third embodiment.

3-5: Transmission Method Including Dynamic Packet Length Modification Processing Next, a flow of a transmission method including dynamic packet length modification processing will be briefly summarized with reference to FIG. 26. As shown in FIG. 26, first, when arbitrary data is transmitted (S402), an indicator is calculated in the data destination, and whether or not the indicator satisfies a predetermined condition is determined (S404). When the indicator satisfies the predetermined condition, the processing of step S406 is performed. On the other hand, when the indicator does not satisfy the predetermined condition, the first communication apparatus 530 proceeds to the processing of step S402 again. When the first communication apparatus 530 proceeds to the processing of step S406, a packet length is determined according to the indicator, and the packet length is specified to the packet length for transmission (S406). Next, the transmission data is transmitted by divided packets of the specified length (S408). Next, whether or not all the data is transmitted is determined (S410). When all the data is transmitted, the first communication apparatus 530 ends the series of the processing, and when all the data is not yet transmitted, the first communication apparatus 530 proceeds to the processing of step S406 again.

By repeatedly performing the processing in the above flow, it is possible to transmit data while dynamically modifying the packet length in accordance with the communication condition. As a result, the total communication time used to transmit entire data is shortened, so that the convenience of the user improves.

4: Addendum

Hereinafter, applicable techniques in each embodiment described above will be briefly described.

4-1: Detection Method of Soft Decision Data

The soft decision data generation section 204 can be constituted by a sampling clock generation section 800, a soft decision baseband signal generation section 820, and a data generation section 830. Hereinafter, circuit configuration examples of these constituent elements will be described in detail. The circuit configuration examples are the same as for the soft decision data generation sections 404, 504, and 604.

4-1-1: Circuit Configuration of Sampling Clock Generation Section 800

First, the sampling clock generation section 800 will be described. A driving clock having a similar frequency to that of a carrier wave of the digitally modulated signal is input into the sampling clock generation section 800. This driving clock is for driving the digital circuit and becomes a reference to control operation timings of the digital circuit.

The sampling clock generation section 800 generates a sampling clock by delaying the input driving clock by a time shorter than the cycle of the driving clock. For example, the sampling clock generation section 800 generates a plurality of sampling clocks having phases different from one another. The sampling clocks generated by the sampling clock generation section 800 are input into the soft decision baseband signal generation section 820 and the data generation section 830.

Hereinafter, a specific circuit configuration of the sampling clock generation section 800 will be described with reference to FIG. 27. FIG. 27 is an illustration showing an example of the specific circuit configuration of the sampling clock generation section 800. When the driving clock (Clock) is input, the sampling clock generation section 800 illustrated in FIG. 27 generates 8 sampling clocks, phases of which are shifted by the integral multiple of one-eighth cycle of the driving clock.

As shown in FIG. 27, the sampling clock generation section 800 includes delay sections 804, 808, and 812, and inverters 802, 806, 810, and 814. The function of the delay sections 804, 808, and 812 is realized by, for example, a programmable delay element. The function of the inverters 802, 806, 810, and 814 is realized by, for example, an inverter circuit operating faster than the cycle of the driving clock.

First, the driving clock (Clock) is input. The input driving clock is output as a sampling clock Clk [0], and input into the delay sections 804, 808, and 812, and the inverter 802. Since the sampling clock Clk [0] is the driving clock itself, the sampling clock Clk [0] has the same phase as that of the driving clock.

The inverter 802 inverts the input driving signal. The inverted driving clock is output as a sampling clock Clk [4]. Since the sampling clock Clk [4] is an inverted driving clock, the sampling clock Clk [4] has a phase delayed by four-eighth cycle from the sampling clock Clk [0].

The delay section 804 delays the driving clock by one-eighth cycle in accordance with control signals input from a selector. The delayed driving clock is output as a sampling clock Clk [1], and input into the inverter 806. Since the sampling clock Clk [1] is a clock delayed by one-eighth cycle from the driving clock, the sampling clock Clk [1] has a phase delayed by one-eighth cycle from the sampling clock Clk [0].

The inverter 806 inverts the driving clock delayed by one-eighth cycle (corresponding to the sampling clock Clk [1]). The inverted driving clock is output as a sampling clock Clk [5]. Since the sampling clock Clk [5] is an inverted clock of the driving clock delayed by one-eighth cycle, the sampling clock Clk [5] has a phase delayed by five-eighth cycle from the sampling clock Clk [0].

The delay section 808 delays the driving clock by two-eighth cycle in accordance with the control signals input from the selector. The delayed driving clock is output as a sampling clock Clk [2], and input into the inverter 810. Since the sampling clock Clk [2] is a clock delayed by two-eighth cycle from the driving clock, the sampling clock Clk [2] has a phase delayed by two-eighth cycle from the sampling clock Clk [0].

The inverter 810 inverts the driving clock delayed by two-eighth cycle (corresponding to the sampling clock Clk [2]). The inverted driving clock is output as a sampling clock Clk [6]. Since the sampling clock Clk [6] is an inverted clock of the driving clock delayed by two-eighth cycle, the sampling clock Clk [6] has a phase delayed by six-eighth cycle from the sampling clock Clk [0].

The delay section 812 delays the driving clock by three-eighth cycle in accordance with the control signals input from the selector. The delayed driving clock is output as a sampling clock Clk [3], and input into the inverter 814. Since the sampling clock Clk [3] is a clock delayed by three-eighth cycle from the driving clock, the sampling clock Clk [3] has a phase delayed by three-eighth cycle from the sampling clock Clk [0].

The inverter 814 inverts the driving clock delayed by three-eighth cycle (corresponding to the sampling clock Clk [3]). The inverted driving clock is output as a sampling clock Clk [7]. Since the sampling clock Clk [7] is an inverted clock of the driving clock delayed by three-eighth cycle, the sampling clock Clk [7] has a phase delayed by seven-eighth cycle from the sampling clock Clk [0].

In this way, eight types of sampling clocks Clk [0] to Clk [7], which have phases different from one another, are generated. Although, in the example of FIG. 27, the delay sections 804, 808, 812 are configured to be arranged in parallel, for example, a configuration in which three delay circuits which delay the driving clock by one-eighth cycle are arranged in series may be employed. In the example of FIG. 27, since the sampling clocks are generated on the basis that the inversion changes the phases by it, it is preferred that a signal having a duty ratio of about 50% is used as the driving clock.

The sampling clocks Clk [0] to Clk [7] generated in this way are input into the soft decision baseband signal generation section 820 and the data generation section 830.

In the above example, the digitally modulated signal is assumed to be Manchester code or a binary phase shift keying signal. For such a signal, as in the above example, it is desired that the phase of the carrier wave is divided into eight equal parts and 8 types of sampling clocks having phases different from one another are prepared. For example, if the number of the types of the sampling clock is reduced from 8 to 4, only when the phase is shifted by one phase, the data is difficult to be detected. Therefore, when using the Manchester code or the binary phase shift keying signal, it is appropriate that the number of the types of the sampling clock is about 8. When using a four-phase shift keying signal, it is appropriate that the number of the types of the sampling clock is about 16.

4-1-2: Circuit Configuration of Soft Decision Baseband Signal Generation Section 820

Next, the soft decision baseband signal generation section 820 will be described with reference to FIG. 28. As shown in FIG. 28, the soft decision baseband signal generation section 820 includes a plurality of D flip-flops 822, 824, a plurality of multipliers 826, and an adder 828.

The received digitally modulated signal (hereinafter, received signal) and the sampling clocks Clk [0] to Clk [7] generated by the sampling clock generation section 800 are input into each D flip-flop 822. The D flip-flops 822 sample the received signal with one bit accuracy at a timing when the input sampling clocks Clk [k] (k=0 to 7) rise, and generate sampling data. Further, the D flip-flops 822 hold the sampling data until the next rising timing of the sampling clocks.

In other words, in the D flip-flops 822, the sampling data are updated in synchronization with the cycle of the sampling clocks Clk [k]. The sampling data obtained by the D flip-flops 822 are input into the next stage D flip-flops 824. Further, the sampling clock Clk [0] (driving clock) is input into the next stage D flip-flops 824. The D flip-flops 824 are provided to synchronize the sampling data obtained by the previous stage D flip-flops 822 with the driving clock.

First, the D flip-flops 824 obtain the sampling data held by the previous stage D flip-flops 822 at a timing when the input sampling clock Clk [0] rises. Next, the D flip-flops 824 hold the obtained sampling data until the next rising timing of the sampling clock Clk [0]. In other words, the D flip-flops 824 hold the sampling data obtained from the previous stage D flip-flops 822 for one cycle of the sampling clock Clk [0].

By such processing of the D flip-flops 824, the sampling data synchronized with the sampling clock Clk [k] (k≠0) in the previous stage D flip-flops 822 synchronize with the sampling clock Clk [0].

To synchronize the sampling data with the sampling clock Clk [0], settling of the sampling data by the D flip-flops 822 has to be completed at the timing when the D flip-flops 824 obtain the sampling data. However, if the settling time is long because of a reason such as wiring delay, the settling of the sampling data may not be completed at the timing when the D flip-flops 824 obtain the sampling data.

When such a situation is expected, it is preferred that an appropriate number of D flip-flops are provided between the D flip-flops 822 and the D flip-flops 824. By employing the above configuration and delaying the synchronization timing of the sampling data, each sampling data can be synchronized with the sampling clock Clk [0] even when wiring delay or the like occurs. The sampling data obtained by the D flip-flops 824 are input into the multipliers 826. Predetermined coefficients K0 to K7 are held in each multiplier 826.

First, the multipliers 826 obtain the sampling data from the D flip-flops 824. The multipliers 826 multiply the obtained sampling data by the coefficients Ki (i=0 to 7) held in the multipliers 826. Output values from the multipliers 826 (hereinafter, sampling data) are input into the adder 828.

The above coefficients Ki are set based on information of the sampling clock Clk [k] having a phase closest to the phase of the carrier wave of the received signal. For example, consider a case in which the phase of the sampling clock Clk [0] is closest to the phase of the carrier wave. When the received signal is a BPSK signal, the combination of coefficients Ki is set as, for example, (K0, K1, K2, K3, K4, K5, K6, K7)=(1, 2, 2, 1, −1, −2, −2, −1). In another example, the combination of coefficients Ki may be set as (K0, K1, K2, K3, K4, K5, K6, K7)=(1, 3, 3, 1, −1, −3, −3, −1).

The adder 828 sums the sampling data input from a plurality of multipliers 826 and generates a soft decision baseband signal (RfData). The soft decision baseband signal here is a sum of values obtained by multiplying eight sampling data sampled in one cycle of the carrier wave by the coefficients. When the combination of the coefficients Ki is set as (1, 2, 2, 1, −1, −2, −2, −1), the value of the soft decision baseband signal will be between −6 to 6. The soft decision baseband signal generated in this way is input into the data generation section 830.

The sign of the soft decision baseband signal represents a bit value of the original data. For example, the positive sign of the soft decision baseband signal represents the bit value "1", and the negative sign of the soft decision baseband signal represents the bit value "0". The absolute value of the soft decision baseband signal represents the probability of the bit values. Therefore, when the information of the sampling clock having a phase closest to the phase of the carrier wave is not obtained, by determining the coefficients K0 to K7 for every sampling clock, generating the soft decision baseband signals for every sampling clock, and comparing the absolute values of the soft decision baseband signals, it is possible to determine the sampling clock having a phase closest to the phase of the carrier wave.

4-1-3: Circuit Configuration of Data Generation Section 830

Next, the data generation section 830 will be described with reference to FIG. 29. In the data generation section 830, a data clock DClk and data sampling clocks DClk [k] (k=0 to 7) described below are assumed to be input.

The data clock DClk has the same cycle as that of the original data of the received signal, and is a periodical wave synchronized with the driving clock. For example, the data cycle of the received signal is set to 8 times the cycle of the carrier wave. In this example, the cycle of the data clock DClk is set to 8 times the cycle of the driving clock. Here, The data cycle here is a cycle in which an interval assigned to each data value in a code series into which the original data is encoded appears. The data cycle of the received signal is set to an integral multiple of the cycle of the carrier wave. The data clock DClk is generated by dividing the driving clock by 8. On the other hand, the data sampling clocks DClk [k] (k=0 to 7) are generated by delaying the phase of the data clock DClk. For example, the data sampling clocks DClk [k] (k=0 to 7) are generated by delaying the phase of the data clock DClk by k-eighth cycle.

As shown in FIG. 29, the data generation section 830 includes a plurality of D flip-flops 832, 834, a plurality of multipliers 836, and an adder 838.

The soft decision baseband signal generated by the soft decision baseband signal generation section 820 and the data sampling clocks DClk [0] to DClk [7] are input into each D flip-flop 832. The D flip-flops 832 sample the soft decision baseband signal with 3 bits accuracy at a timing when the input data sampling clocks DClk [k] (k=0 to 7) rise, and generate sampling data. Further, the D flip-flops 832 holds the sampling data until the next rising timing of the data sampling clocks.

In other words, in the D flip-flops 832, the sampling data are updated in synchronization with the cycle of the data sampling clocks DClk [k]. The sampling data obtained by the D flip-flops 832 are input into the next stage D flip-flops 834. The data clock DClk is input into the next stage D flip-flops 834. The D flip-flops 834 are provided to synchronize the sampling data obtained by the previous stage D flip-flops 832 with the data clock DClk.

First, the D flip-flops 834 obtain the sampling data held by the previous stage D flip-flops 832 at a timing when the input data sampling clock DClk [0] rises. Next, the D flip-flops 834 hold the obtained sampling data until the next rising timing of the data sampling clock DClk [0]. In other words, the D flip-flops 834 hold the sampling data obtained from the previous stage D flip-flops 832 for one cycle of the data sampling clock DClk [0].

By such processing of the D flip-flops 834, the sampling data synchronized with the data sampling clock DClk [k] in the previous stage D flip-flops 832 synchronize with the data clock DClk. To synchronize the sampling data with the data clock DClk, settling of the sampling data by the D flip-flops 832 has to be completed at the timing when the D flip-flops 834 obtain the sampling data. However, if the settling time is long because of a reason such as wiring delay, the settling of the sampling data may not be completed at the timing when the D flip-flops 834 obtain the sampling data.

When such a situation is expected, it is preferred that an appropriate number of D flip-flops are provided between the D flip-flops 832 and the D flip-flops 834. By employing the above configuration and delaying the synchronization timing of the sampling data, each sampling data can be synchronized with the data clock DClk even when wiring delay or the like occurs. The sampling data obtained by the D flip-flops 834 are input into the multipliers 836. Predetermined coefficients Q0 to Q7 are held in each multiplier 836.

First, the multipliers 836 obtain the sampling data from the D flip-flops 834. The multipliers 836 multiply the obtained sampling data by the coefficients Qi (i=0 to 7) held in the multipliers 836. Output values from the multipliers 836 (hereinafter, sampling data) are input into the adder 838.

The above coefficients Qi are set based on information of the data sampling clock DClk [k] having a phase closest to the data clock DClk. For example, consider a case in which the phase of the data sampling clock DClk [0] is closest to the phase of the data clock DClk. In this case, the combination of coefficients Qi is set as, for example, (Q0, Q1, Q2, Q3, Q4, Q5, Q6, Q7)=(1, 1, 1, 1, −1, −1, −1, −1). In this case, a difference value between the sum of values obtained by sampling the soft decision baseband signal in a half cycle located in the first half of the data cycle and the sum of values obtained by sampling the soft decision baseband signal in a half cycle located in the second half of the data cycle becomes the soft decision data (output of the adder 838).

The adder 838 sums the sampling data input from a plurality of multipliers 836 and generates a soft decision data (EQ-Data). For example, when setting the Qi as described above, the value of the soft decision data becomes between −48 to 48. The soft decision data obtained in this way is input into the indicator calculation section 206 as the value detected by the soft decision data generation section 204.

The sign of the soft decision data represents a bit value of the original data. For example, the positive sign of the soft decision data represents the bit value "1", and the negative sign of the soft decision data represents the bit value "0". The absolute value of the soft decision data represents the probability of the bit values. Therefore, when the information of the data sampling clock having a phase closest to the phase of the data clock DClk is not obtained, by determining the coefficients Q0 to Q7 for every data sampling clock, generating the soft decision data for every data sampling clock, and comparing the absolute values of the soft decision data, it is possible to determine the data sampling clock having a phase closest to the phase of the data clock DClk.

It should be understood by those skilled in the art that various modifications, combinations, sub-combinations and alterations may occur depending on design requirements and other factors insofar as they are within the scope of the appended claims or the equivalents thereof.

(Note)

The soft decision data generation sections 204, 404, 504, and 604 are an example of a soft decision data detection section. The indicator calculation sections 206, 406, 506, and 606 are an example of an indicator calculation section, a standard deviation calculation section, and an absolute value average calculation section. The packet length modification sections 210, 310, 514, and 614 are an example of a packet length control section, a packet length calculation section, and a packetizing section. The signal transmission sections 412, 518, and 618, the packetizing section 408, and the packet length modification sections 514 and 614 are an example of an indicator transmission section.

The present application contains subject matter related to that disclosed in Japanese Priority Patent Application JP 2009-039939 filed in the Japan Patent Office on Feb. 23, 2009, the entire content of which is hereby incorporated by reference.

What is claimed is:

1. A communication apparatus, comprising:
a soft decision data detection section which detects soft decision data from a received digitally modulated signal;
an indicator calculation section which calculates an indicator indicating a degree of variation in the soft decision data detected by the soft decision data detection section; and
a packet length control section which controls a packet length in accordance with the indicator calculated by the indicator calculation section, wherein the indicator calculation section includes:
a standard deviation calculation section which calculates a standard deviation of the soft decision data of some or all of packets included in the digitally modulated signal; and
an absolute value average calculation section which calculates an average value of absolute values of the soft decision data of some or all of the packets, and
the indicator calculation section calculates the indicator based on the standard deviation calculated by the standard deviation calculation section and the average value calculated by the absolute value average calculation section.

2. The communication apparatus according to claim 1, wherein the indicator calculation section calculates the indicator $S=\sigma/(2*E)$ based on the standard deviation $\sigma$ and the average value E.

3. The communication apparatus according to claim 2, wherein the packet length control section shortens the packet length when the indicator S is large, and lengthens the packet length when the indicator S is small.

4. The communication apparatus according to claim 3, wherein the packet length control section refers to a predetermined table configured to associate predetermined packet lengths with the indicators S, selects a predetermined packet length in accordance with the indicator S calculated by the indicator calculation section, and packetizes data so that the data has the predetermined packet length.

5. The communication apparatus according to claim 3, wherein the packet length control section includes:
a packet length calculation section which uses a predetermined calculation formula for calculating an expected value of a time used to transmit all data of n bits which is transmitted by dividing the data into packets of k bits (n>k) when a communication condition corresponds to the indicator S, and calculates a packet length k which makes the expected value minimum; and
a packetizing section which divides transmission data based on the packet length k calculated by the packet length calculation section in accordance with the indicator S calculated by the indicator calculation section and the number of bits n of the transmission data, and packetizes the divided transmission data.

6. The communication apparatus according to claim 3, further comprising a communication control section which stops data transmission processing when the indicator calculated by the indicator calculation section is greater than a predetermined threshold value, and re-starts the data transmission processing when the indicator is smaller than a predetermined threshold value.

7. The communication apparatus according to claim 1, further comprising an indicator transmission section which transmits information of the indicator calculated by the indicator calculation section to a transmission source of the digitally modulated signal.

8. A communication apparatus, comprising:
an indicator reception section which receives an indicator when soft decision data of a digitally modulated signal is detected in a transmission destination of the digitally modulated signal transmitted by the communication apparatus, and the indicator representing a degree of variation in the soft decision data is calculated and transmitted to the communication apparatus; and
a packet length control section which controls a packet length in accordance with the indicator received by the indicator reception section, wherein the packet length control section shortens the packet length when the indicator S is large, and lengthens the packet length when the indicator S is small.

9. The communication apparatus according to claim 8, wherein the packet length control section refers to a predetermined table configured to associate predetermined packet lengths with the indicators, selects a predetermined packet length in accordance with the indicator calculated by the indicator calculation section, and packetizes data by the predetermined packet length.

10. The communication apparatus according to claim 9, wherein the packet length control section includes:
a packet length calculation section which uses a predetermined calculation formula for estimating an expected value of a time used to transmit all data of n bits which is transmitted by dividing the data into packets of k bits (n>k) when a communication condition corresponds to the indicator S, and calculates a packet length k which makes the expected value minimum; and
a packetizing section which divides transmission data based on the packet length k calculated by the packet length calculation section in accordance with the indicator S calculated by the indicator calculation section and the number of bits n of the transmission data, and packetizes the divided transmission data.

11. The communication apparatus according to claim 8, further comprising a communication control section which transmits a digitally modulated signal including a predetermined packet when the indicator received by the indicator reception section is greater than a predetermined threshold value.

12. A communication system, comprising:
a first communication device including
a signal transmission section which transmits a digitally modulated signal to a second communication device,
an indicator reception section which receives an indicator transmitted from the second communication device, and
a packet length control section which controls a packet length of a packet to be transmitted to the second communication device in accordance with the indicator received by the indicator reception section; and
the second communication device including
a signal reception section which receives the digitally modulated signal transmitted from the first communication device,
a soft decision data detection section which detects soft decision data from the digitally modulated signal received by the signal reception section,
an indicator calculation section which calculates an indicator indicating a degree of variation in the soft decision data detected by the soft decision data detection section, and an indicator transmission section which transmits the indicator calculated by the indicator calculation section to the first communication device.

13. A packet length control method, comprising the steps of:
detecting soft decision data from a received digitally modulated signal;
calculating an indicator indicating a degree of variation in the soft decision data detected in the step of detecting soft decision data; and
controlling a packet length in accordance with the indicator calculated in the step of calculating an indicator, wherein controlling a packet length includes:
calculating a standard deviation of the soft decision data of some or all of packets included in the digitally modulated signal; and
calculating an average value of absolute values of the soft decision data of some or all of the packets, and
calculating the indicator based on the calculated standard deviation and the calculated average value.

14. A packet length control method, comprising the steps of:
receiving an indicator when soft decision data of a transmitted digitally modulated signal is detected in a transmission destination of the digitally modulated signal, and the indicator representing a degree of variation in the soft decision data is calculated and transmitted to a transmission source of the digitally modulated signal; and
controlling a packet length in accordance with the indicator received in the step of receiving an indicator, wherein the packet length is shortened when the indicator S is large, and the packet length is lengthened when the indicator S is small.

15. A packet length control method, comprising the steps of:
by a first communication device,
transmitting a digitally modulated signal to a second communication device; by the second communication device,
receiving the digitally modulated signal transmitted from the first communication device;
detecting soft decision data from the digitally modulated signal received in the step of receiving the digitally modulated signal;
calculating an indicator indicating a degree of variation in the soft decision data detected in the step of detecting soft decision data;
transmitting the indicator calculated in the step of calculating an indicator to the first communication device;
by the first communication device,
receiving the indicator transmitted from the second communication device; and controlling a packet length of a packet to be transmitted to the second communication device in accordance with the indicator received in the step of receiving the indicator.

* * * * *